US 11,456,768 B2

(12) United States Patent
Han et al.

(10) Patent No.: US 11,456,768 B2
(45) Date of Patent: Sep. 27, 2022

(54) ELECTRONIC DEVICE HAVING ADJUSTABLE ANTENNA SETTINGS

(71) Applicant: Apple Inc., Cupertino, CA (US)

(72) Inventors: Liang Han, Sunnyvale, CA (US); Matthew A. Mow, Los Altos, CA (US); Mattia Pascolini, San Francisco, CA (US); Ruben Caballero, San Jose, CA (US); Thomas E. Biedka, San Jose, CA (US); Yuancheng Xu, Melbourne, FL (US); Iyappan Ramachandran, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/930,298

(22) Filed: May 12, 2020

(65) Prior Publication Data
US 2020/0274570 A1   Aug. 27, 2020

Related U.S. Application Data

(62) Division of application No. 16/017,847, filed on Jun. 25, 2018, now Pat. No. 10,693,516.

(51) Int. Cl.
*H04B 1/3827* (2015.01)
*H04M 1/03* (2006.01)
(Continued)

(52) U.S. Cl.
CPC ......... *H04B 1/3838* (2013.01); *G06K 9/6289* (2013.01); *G06T 7/521* (2017.01);
(Continued)

(58) Field of Classification Search
CPC ... H04B 1/3838; H04B 1/40; H04M 1/72454; H04M 1/03; H04M 1/0264;
(Continued)

(56) References Cited

U.S. PATENT DOCUMENTS

| 6,895,225 B1 | 5/2005 | Talvitie et al. |
| 8,781,420 B2 | 7/2014 | Schlub et al. |

(Continued)

*Primary Examiner* — Eugene Yun
(74) *Attorney, Agent, or Firm* — Treyz Law Group, P.C.; Tianyi He

(57) ABSTRACT

An electronic device may include control circuitry, sensors, and wireless circuitry having antennas. The sensors may generate sensor data that is used by the control circuitry to identify an operating environment for the device. The sensor data may include a grip map generated by a touch-sensitive display, infrared facial recognition image signals or other image signals, an angle of arrival of sound received by a set of microphones, impedance data from an impedance sensor, and any other desired sensor data. The control circuitry may use the sensor data, radio-frequency spatial ranging data, information about whether audio is being played over an ear speaker, and/or information about communications protocols in use to identify the operating environment. The control circuitry may adjust antenna settings for the wireless circuitry based on the identified operating environment to ensure that the antennas operate with satisfactory antenna efficiency regardless of operating conditions.

17 Claims, 13 Drawing Sheets

(51) Int. Cl.
*H04M 1/02* (2006.01)
*G06K 9/62* (2022.01)
*G06T 7/521* (2017.01)
*H04W 52/28* (2009.01)
*G06T 7/55* (2017.01)
*H04M 1/72454* (2021.01)
*G06V 10/143* (2022.01)

(52) U.S. Cl.
CPC .............. *G06T 7/55* (2017.01); *G06V 10/143* (2022.01); *H04M 1/0264* (2013.01); *H04M 1/03* (2013.01); *H04M 1/72454* (2021.01); *H04W 52/283* (2013.01)

(58) Field of Classification Search
CPC ............ H04M 2250/52; H04M 1/6008; G06K 9/2018; G06K 9/6289; G06K 9/00228; G06T 7/521; G06T 7/55
USPC .......................................................... 455/77
See application file for complete search history.

(56) References Cited

U.S. PATENT DOCUMENTS

| | | |
|---|---|---|
| 9,692,478 B1 | 6/2017 | Knepper et al. |
| 9,774,362 B1 | 9/2017 | Sammeta et al. |
| 10,056,695 B2 | 8/2018 | Ayala Vazquez et al. |
| 2009/0303005 A1* | 12/2009 | Tuttle ...................... H04Q 9/00 340/10.1 |
| 2011/0076966 A1* | 3/2011 | Ishimiya .............. H04B 1/0458 455/78 |
| 2012/0062230 A1 | 3/2012 | Vaughan, Jr. et al. |
| 2013/0342322 A1* | 12/2013 | Hinman ............. G06K 7/10287 340/10.1 |
| 2015/0169045 A1* | 6/2015 | Yang ...................... G06F 3/011 345/156 |
| 2015/0201387 A1 | 7/2015 | Khawand et al. |
| 2015/0237183 A1 | 8/2015 | Novet |
| 2016/0217789 A1 | 7/2016 | Lee et al. |
| 2018/0048793 A1 | 2/2018 | Kovacs et al. |
| 2018/0069295 A1 | 3/2018 | Han et al. |
| 2018/0083344 A1 | 3/2018 | Han et al. |
| 2018/0196475 A1 | 7/2018 | Bao et al. |
| 2018/0342794 A1 | 11/2018 | Han et al. |

* cited by examiner

ELECTRONIC DEVICE HAVING ADJUSTABLE ANTENNA SETTINGS

This application is a divisonal application of U.S. patent application Ser. No. 16/017,847, filed on Jun. 25, 2018. This application claims benefit of and claims priority to U.S. patent application Ser. No. 16/017,847, whichis hereby incorporated by reference herein.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some electronic devices, antennas are bulky. In other devices, antennas are compact, but are sensitive to the position of the antennas relative to external objects. If care is not taken, antennas may become detuned, may emit wireless signals with a power that is more or less than desired, or may otherwise not perform as expected. In addition, it is often difficult to perform wireless communications with a satisfactory data rate (data throughput), especially as software applications performed by electronic devices become increasingly data hungry.

It would therefore be desirable to be able to provide improved wireless communications circuitry for electronic devices.

SUMMARY

An electronic device may be provided with wireless circuitry and a housing having peripheral conductive housing structures. The peripheral conductive housing structures may be used to form resonating elements for a set of antennas. If desired, the antennas may concurrently operate at one or more of the same frequencies under a multiple-input and multiple-output (MIMO) protocol.

The electronic device may monitor its operating environment using one or more sensors. For example, the electronic device may include a touch-sensitive display. The touch-sensitive display may generate a grip map that identifies locations on the touch-sensitive display that are in contact with an external object such as the hand of a user. The touch-sensitive display may also be force-sensitive. The grip map may include force data for each of the identified locations in contact with the external object.

The electronic device may also include an image sensor and a light source. The light source may emit infrared light. The image sensor may generate image data in response to a reflected version of the infrared light emitted by the light source. Control circuitry in the electronic device may perform user authentication operations using the image data, may generate a depth map using the image data, and/or may perform object detection operations based on the image data.

The electronic device may also include multiple microphones distributed across the device. The microphones may gather audio signals in response to a sound received by the microphones. The control circuitry may process the audio signals to determine an angle of arrival of the sound. The electronic device may include other sensors such as an impedance sensor that generates impedance data, a proximity sensor that generates proximity data, an ambient light sensor that generates ambient light data, an orientation and motion sensor that generates orientation and motion data, and other sensors.

If desired, the control circuitry may gather spatial ranging data indicative of a distance between the device and an external object using transmitted and reflected radio-frequency signals. The control circuitry may use combinations of one or more of these types of data, information about whether audio is being played through an ear speaker on the device, and/or information about wireless communications protocols that are being used by device 10 to identify an operating environment for the electronic device.

The control circuitry may adjust antenna settings for the wireless communications circuitry to place the circuitry into one of a number of different operating modes based on the identified operating environment. The operating modes may include a head mode for scenarios where the device is being held to the user's head, a hand mode for scenarios where the device is being held by the user away from their head, a free space mode, and a vehicle mode for scenarios where the device is resting on a surface inside a vehicle.

The antenna settings may include a set of active antennas to use for performing MIMO operations, a set of active antenna feeds to use for conveying radio-frequency signals, maximum transmit power levels, operating frequencies, and/or antenna tuning settings, as examples. In this way, the control circuitry may control the wireless communications circuitry to ensure that satisfactory antenna efficiency is achieved regardless of operating environment.

DETAILED DESCRIPTION

Figure 1:
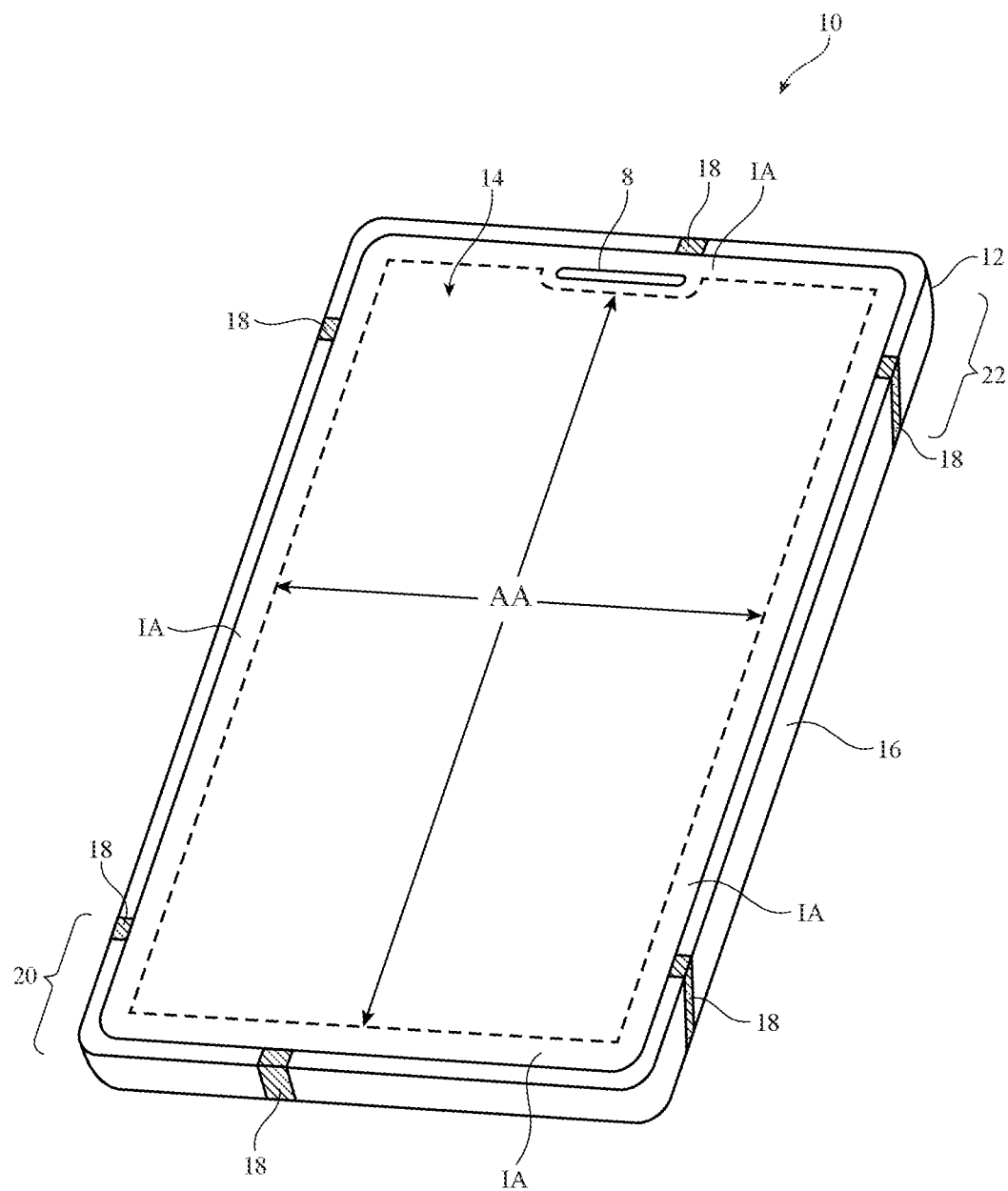
FIG. 1 is a perspective view of an illustrative electronic device in accordance with an embodiment.

Electronic devices such as electronic device 10 of FIG. 1 may be provided with wireless communications circuitry. The wireless communications circuitry may be used to support wireless communications in multiple wireless communications bands.

The wireless communications circuitry may include one or more antennas. The antennas of the wireless communications circuitry can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of the electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane and/or an antenna resonating element formed from conductive housing structures (e.g., internal and/or external structures, support plate structures, etc.).

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a rear housing wall (e.g., a planar housing wall). The rear housing wall may have slots that pass entirely through the rear housing wall and that therefore separate housing wall portions (rear housing wall portions and/or sidewall portions) of housing 12 from each other. The rear housing wall may include conductive portions and/or dielectric portions. If desired, the rear housing wall may include a planar metal layer covered by a thin layer or coating of dielectric such as glass, plastic, sapphire, or ceramic. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. If desired, buttons may pass through openings in the cover layer. The cover layer may also have other openings such as an opening for speaker port 8.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, peripheral conductive housing sidewall structures, peripheral conductive housing sidewalls, peripheral conductive sidewalls, or a peripheral conductive housing member (as examples). Peripheral conductive housing structures 16 may be formed from a metal such as stainless steel, aluminum, or other suitable materials. One, two, three, four, five, six, or more than six separate structures may be used in forming peripheral conductive housing structures 16.

It is not necessary for peripheral conductive housing structures 16 to have a uniform cross-section. For example, the top portion of peripheral conductive housing structures 16 may, if desired, have an inwardly protruding lip that helps hold display 14 in place. The bottom portion of peripheral conductive housing structures 16 may also have an enlarged lip (e.g., in the plane of the rear surface of device 10). Peripheral conductive housing structures 16 may have substantially straight vertical sidewalls, may have sidewalls that are curved, or may have other suitable shapes. In some configurations (e.g., when peripheral conductive housing structures 16 serve as a bezel for display 14), peripheral conductive housing structures 16 may run around the lip of housing 12 (i.e., peripheral conductive housing structures 16 may cover only the edge of housing 12 that surrounds display 14 and not the rest of the sidewalls of housing 12).

If desired, housing 12 may have a conductive rear surface or wall. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a conductive rear housing wall of device 10 may be formed from a planar metal structure and portions of peripheral conductive housing structures 16 on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The conductive rear wall of housing 12 may have one or more, two or more, or three or more portions. Peripheral conductive housing structures 16 and/or the conductive rear wall of housing 12 may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 16 and/or the conductive rear wall of housing 12 from view of the user).

Display 14 may have an array of pixels that form an active area AA that displays images for a user of device 10. An inactive border region such as inactive area IA may run along one or more of the peripheral edges of active area AA.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of peripheral conductive housing structures 16). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 16 and opposing conductive ground structures such as conductive portions of the rear wall of housing 12, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22), thereby narrowing the slots in regions 20 and 22.

In general, device 10 may include any suitable number of antennas (e.g., one or more, two or more, three or more, four or more, etc.). The antennas in device 10 may be located at opposing first and second ends of an elongated device housing (e.g., at regions 20 and 22 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 16 may be provided with peripheral gap structures. For example, peripheral conductive housing structures 16 may be provided with one or more gaps such as gaps 18, as shown in FIG. 1. The gaps in peripheral conductive housing structures 16 may be filled with dielectric such as polymer, ceramic, glass, air, other dielectric materials, or combinations of these materials. Gaps 18 may divide peripheral conductive housing structures 16 into one or more peripheral conductive segments. There may be, for example, two peripheral conductive segments in peripheral conductive housing structures 16 (e.g., in an arrangement with two of gaps 18), three peripheral conductive segments (e.g., in an arrangement with three of gaps 18), four peripheral conductive segments (e.g., in an arrangement with four of gaps 18), six peripheral conductive segments (e.g., in an arrangement with six gaps 18), etc. The segments of peripheral conductive housing structures 16 that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral conductive housing structures 16 and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have one or more upper antennas and one or more lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, near-field communications, etc.

Figure 2:
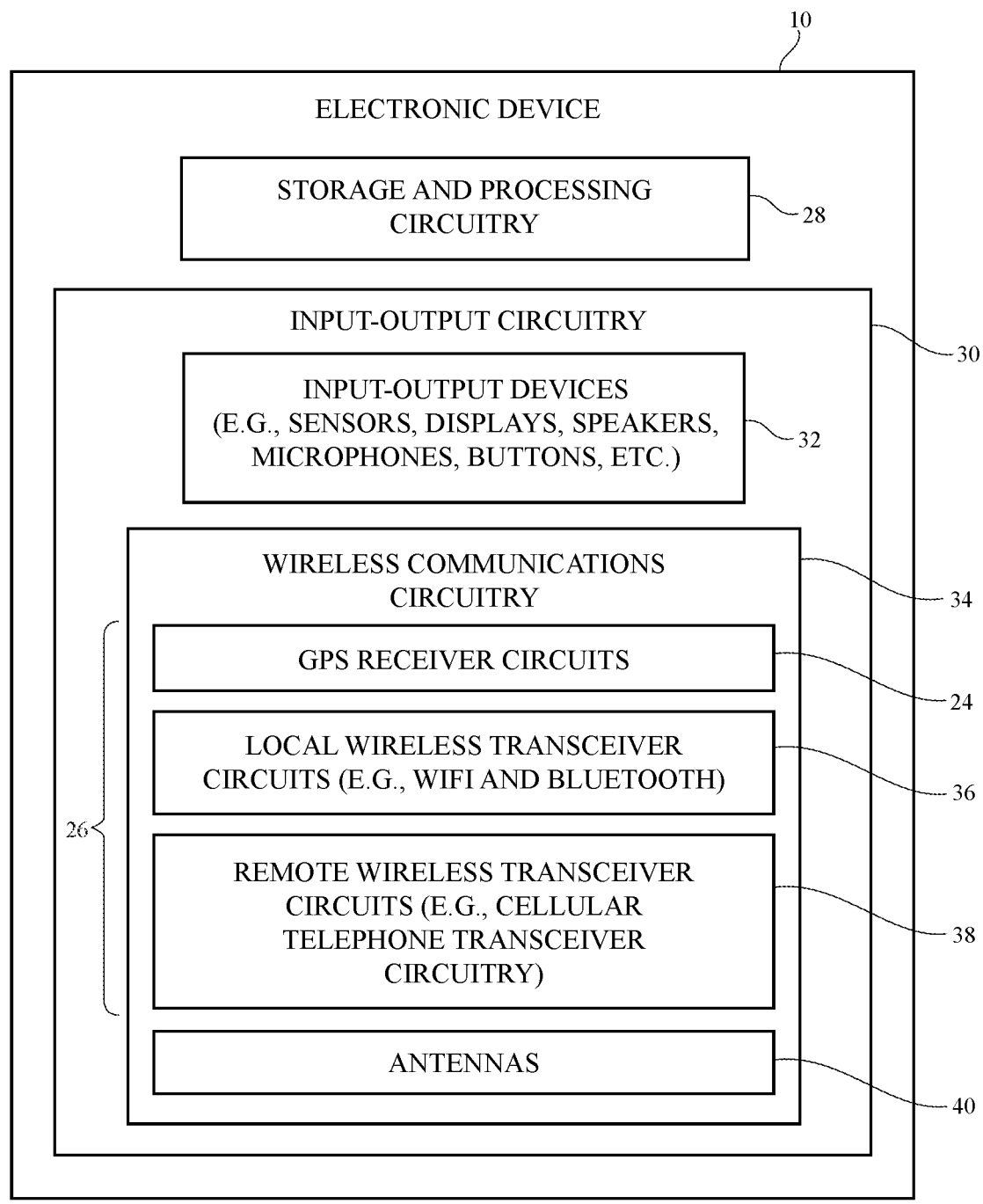
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 (sometimes referred to herein as control circuitry 28) may be used to run software on device 10, such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, near-field communications (NFC) protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors, etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 26 for handling various radio-frequency communications bands. For example, circuitry 34 may include transceiver circuitry 36, 38, and 24. Transceiver circuitry 36 may handle 2.4 GHz and 5 GHz bands for Wi-Fi® (IEEE 802.11) communications or communications in other wireless local area network (WLAN) bands and may handle the 2.4 GHz Bluetooth® communications band or other wireless personal area network (WPAN) bands. Circuitry 34 may use cellular telephone transceiver circuitry 38 for handling wireless communications in frequency ranges such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultra-high band (UHB) from 3400 to 3600 MHz, or other communications bands between 600 MHz and 4000 MHz or other suitable frequencies (as examples).

Circuitry 38 may handle voice data and non-voice data. Wireless communications circuitry 34 can include circuitry for other short-range and long-range wireless links if desired. For example, wireless communications circuitry 34 may include 60 GHz transceiver circuitry (e.g., millimeter wave transceiver circuitry), circuitry for receiving television and radio signals, paging system transceivers, near field communications (NFC) circuitry, etc. Wireless communications circuitry 34 may include global positioning system (GPS) receiver equipment such as GPS receiver circuitry 24 for receiving GPS signals at 1575 MHz or for handling other satellite positioning data. In Wi-Fi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
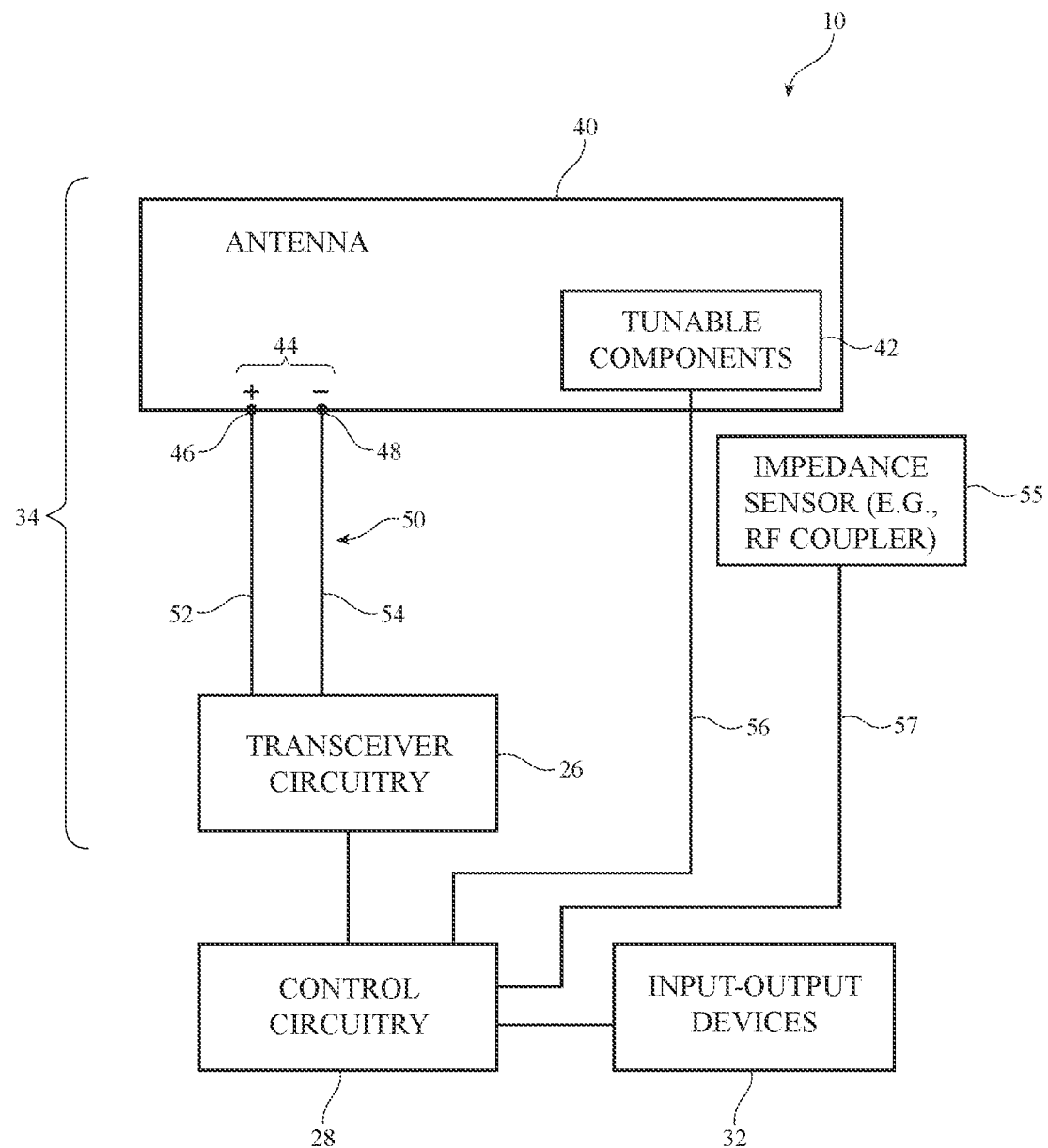
FIG. 3 is a schematic diagram of illustrative wireless communications circuitry in accordance with an embodiment.

As shown in FIG. 3, transceiver circuitry 26 in wireless communications circuitry 34 may be coupled to antenna structures such as a given antenna 40 using paths such as path 50. Wireless communications circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna 40 with the ability to cover communications frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components 42 to tune the antenna over communications bands of interest. Tunable components 42 may be part of a tunable filter or tunable impedance matching network, may be part of an antenna resonating element, may span a gap between an antenna resonating element and antenna ground, etc.

Tunable components 42 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 56 that adjust inductance values, capacitance values, or other parameters associated with tunable components 42, thereby tuning antenna 40 to cover desired communications bands. Antenna tuning components that are used to adjust the frequency response of antenna 40 such as tunable components 42 may sometimes be referred to herein as antenna tuning components, tuning components, antenna tuning elements, tuning elements, adjustable tuning components, adjustable tuning elements, or adjustable components.

Path 50 may include one or more transmission lines. As an example, path 50 of FIG. 3 may be a transmission line having a positive signal conductor such as line 52 and a ground signal conductor such as line 54. Path 50 may sometimes be referred to herein as transmission line 50 or radio-frequency transmission line 50. Line 52 may sometimes be referred to herein as positive signal conductor 52, signal conductor 52, signal line conductor 52, signal line 52, positive signal line 52, signal path 52, or positive signal path 52 of transmission line 50. Line 54 may sometimes be referred to herein as ground signal conductor 54, ground conductor 54, ground line conductor 54, ground line 54, ground signal line 54, ground path 54, or ground signal path 54 of transmission line 50.

Transmission line 50 may, for example, include a coaxial cable transmission line (e.g., ground conductor 54 may be implemented as a grounded conductive braid surrounding signal conductor 52 along its length), a stripline transmission line, a microstrip transmission line, coaxial probes realized by a metalized via, an edge-coupled microstrip transmission line, an edge-coupled stripline transmission line, a waveguide structure (e.g., a coplanar waveguide or grounded coplanar waveguide), combinations of these types of transmission lines and/or other transmission line structures, etc.

Transmission lines in device 10 such as transmission line 50 may be integrated into rigid and/or flexible printed circuit boards. In one suitable arrangement, transmission lines such as transmission line 50 may also include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures).

All of the multiple layers of the laminated structures may be batch laminated together (e.g., in a single pressing process) without adhesive (e.g., as opposed to performing multiple pressing processes to laminate multiple layers together with adhesive).

A matching network (e.g., an adjustable matching network formed using tunable components 42) may include components such as inductors, resistors, and capacitors used in matching the impedance of antenna 40 to the impedance of transmission line 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 50 may be coupled to antenna feed structures associated with antenna 40. As an example, antenna 40 may form an inverted-F antenna, a slot antenna, a hybrid inverted-F slot antenna or other antenna having an antenna feed 44 with a positive antenna feed terminal such as terminal 46 and a ground antenna feed terminal such as ground antenna feed terminal 48. Signal conductor 52 may be coupled to positive antenna feed terminal 46 and ground conductor 54 may be coupled to ground antenna feed terminal 48. Other types of antenna feed arrangements may be used if desired. For example, antenna 40 may be fed using multiple feeds each coupled to a respective port of transceiver circuitry 26 over a corresponding transmission line. If desired, signal conductor 52 may be coupled to multiple locations on antenna 40 (e.g., antenna 40 may include multiple positive antenna feed terminals coupled to signal conductor 52 of the same transmission line 50). Switches may be interposed on the signal conductor between transceiver circuitry 26 and the positive antenna feed terminals if desired (e.g., to selectively activate one or more positive antenna feed terminals at any given time). The illustrative feeding configuration of FIG. 3 is merely illustrative.

Control circuitry 28 may use information from a proximity sensor, wireless performance metric data such as received signal strength information, device orientation information from an orientation sensor, device motion data from an accelerometer or other motion detecting sensor, information about a usage scenario of device 10, information about whether audio is being played through speaker port 8 (FIG. 1), information about whether device 10 is being used to wirelessly communicate using a particular protocol such as a Bluetooth or WLAN protocol, touch and/or force sensor data from a display such as display 14, image data from an image sensor, infrared image data from an infrared image sensor, ambient light sensor data from an ambient light sensor, radio-frequency range and angle of arrival data, microphone data from one or more microphones or other audio sensors, information on desired frequency bands to use for communications, information from one or more antenna impedance sensors such as impedance sensor 55, and/or other information in determining when antenna 40 is being affected by the presence of nearby external objects or is otherwise in need of tuning. In response, control circuitry 28 may adjust an adjustable inductor, adjustable capacitor, switch, or other tunable components such as tunable components 42 to ensure that antenna 40 operates as desired. Adjustments to tunable components 42 may also be made to extend the frequency coverage of antenna 40 (e.g., to cover desired communications bands that extend over a range of frequencies larger than antenna 40 would cover without tuning).

Impedance sensor 55 may be coupled to control circuitry 28 over path 57. Impedance sensor 55 may include radio-frequency coupler circuitry (e.g., one or more radio-frequency couplers) coupled to transmission line 50 and/or portions of antenna 40. Impedance sensor 55 may gather radio-frequency signals (e.g., transmitted and reflected radio-frequency signals or other signals) and may generate corresponding impedance data (e.g., radio-frequency phase and magnitude data) indicative of the impedance of antenna 40. Control circuitry 28 may gather impedance data about the impedance of antenna 40 using impedance sensor 55 over path 57. The impedance data may be used in adjusting wireless communications circuitry 34 if desired.

Antenna 40 may include resonating element structures (sometimes referred to herein as radiating element structures), antenna ground plane structures (sometimes referred to herein as ground plane structures, ground structures, or antenna ground structures), an antenna feed such as feed 44, and other components (e.g., tunable components 42). Antenna 40 may be configured to form any suitable types of antenna. With one suitable arrangement, which is sometimes described herein as an example, antenna 40 is used to implement a hybrid inverted-F-slot antenna that includes both inverted-F and slot antenna resonating elements.

Figure 4:
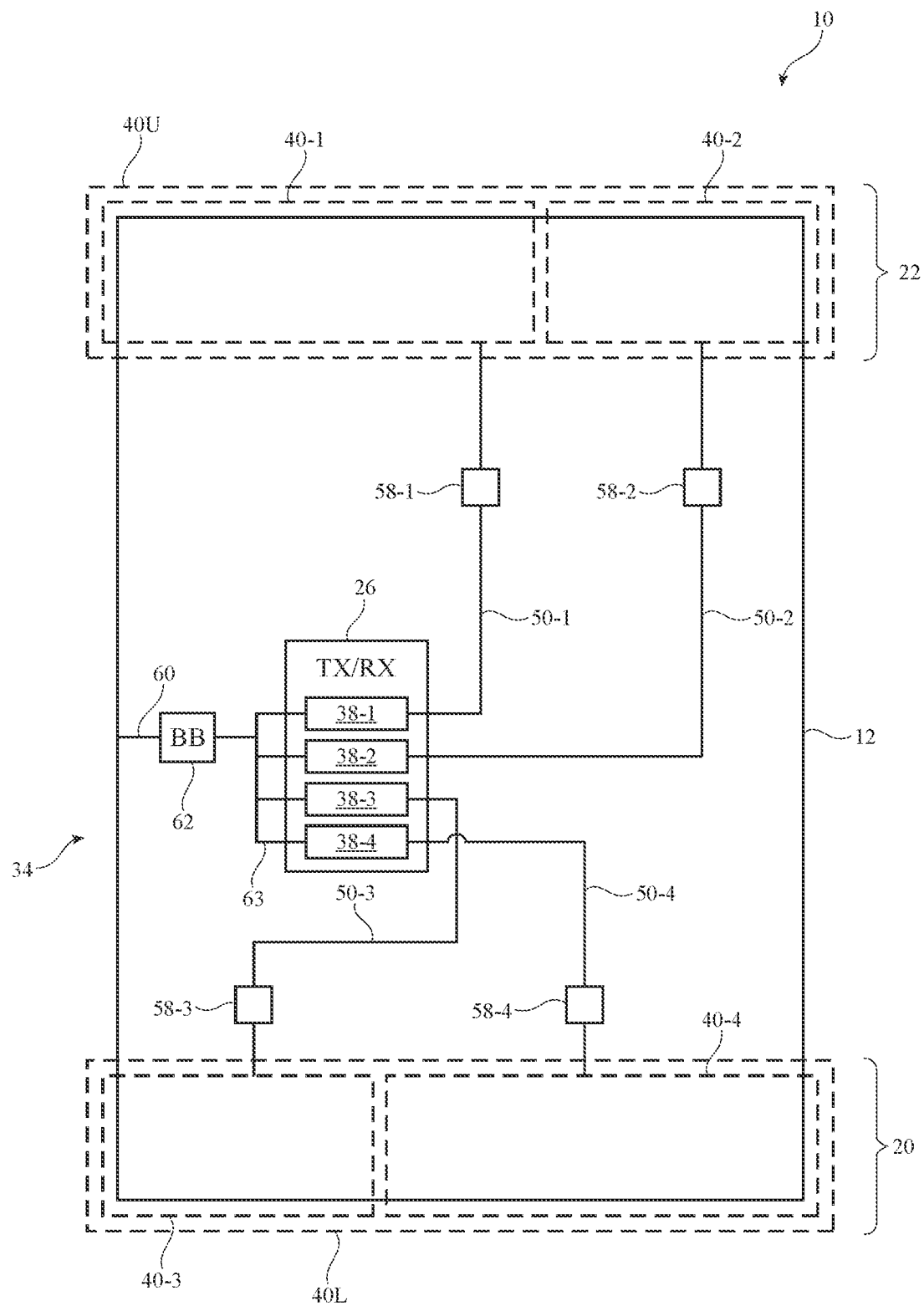
FIG. 4 is a diagram of illustrative wireless circuitry including multiple antennas for performing multiple-input and multiple-output (MIMO) communications in accordance with an embodiment.

If desired, multiple antennas 40 may be formed in device 10. Each antenna 40 may be coupled to transceiver circuitry such as transceiver circuitry 26 over respective transmission lines such as transmission line 50. If desired, two or more antennas 40 may share the same transmission line 50. FIG. 4 is a diagram showing how device 10 may include multiple antennas 40 for performing wireless communications.

As shown in FIG. 4, device 10 may include two or more antennas 40 such as a first antenna 40-1, a second antenna 40-2, a third antenna 40-3, and a fourth antenna 40-4. Antennas 40 may be provided at different locations within housing 12 of device 10. For example, antennas 40-1 and 40-2 may be formed within region 22 at a first (upper) end of housing 12 whereas antennas 40-3 and 40-4 are formed within region 20 at an opposing second (lower) end of housing 12. In the example of FIG. 3, housing 12 has a rectangular periphery (e.g., a periphery having four corners) and each antenna 40 is formed at a respective corner of housing 12. This example is merely illustrative and, in general, antennas 40 may be formed at any desired locations within housing 12.

Wireless communications circuitry 34 may include input-output ports such as port 60 for interfacing with digital data circuits in control circuitry (e.g., storage and processing circuitry 28 of FIG. 2). Wireless communications circuitry 34 may include baseband circuitry such as baseband (BB) processor 62 and radio-frequency transceiver circuitry such as transceiver circuitry 26.

Port 60 may receive digital data from control circuitry that is to be transmitted by transceiver circuitry 26. Incoming data that has been received by transceiver circuitry 26 and baseband processor 62 may be supplied to control circuitry via port 60.

Transceiver circuitry 26 may include one or more transmitters and one or more receivers. For example, transceiver circuitry 26 may include multiple remote wireless transceivers 38 such as a first transceiver 38-1, a second transceiver 38-2, a third transceiver 38-3, and a fourth transceiver 38-4 (e.g., transceiver circuits for handling voice and non-voice cellular telephone communications in cellular telephone communications bands). Each transceiver 38 may be coupled to a respective antenna 40 over a corresponding transmission line 50 (e.g., a first transmission line 50-1, a second transmission line 50-2, a third transmission line 50-3, and a fourth transmission line 50-4). For example, first transceiver 38-1 may be coupled to antenna 40-1 over transmission line 50-1, second transceiver 38-2 may be coupled to antenna 40-2 over transmission line 50-2, third transceiver 38-3 may be coupled to antenna 40-3 over transmission line 50-3, and fourth transceiver 38-4 may be coupled to antenna 40-4 over transmission line 50-4.

Radio-frequency front end circuits 58 may be interposed on each transmission line 50 (e.g., a first front end circuit 58-1 may be interposed on transmission line 50-1, a second front end circuit 58-2 may be interposed on transmission line 50-2, a third front end circuit 58-3 may be interposed on transmission line 50-3, etc.). Front end circuits 58 may each include switching circuitry, filter circuitry (e.g., duplexer and/or diplexer circuitry, notch filter circuitry, low pass filter circuitry, high pass filter circuitry, bandpass filter circuitry, etc.), impedance matching circuitry for matching the impedance of transmission lines 50 to the corresponding antenna 40, networks of active and/or passive components such as tunable components 42 of FIG. 3, radio-frequency coupler circuitry for gathering antenna impedance measurements, amplifier circuitry (e.g., low noise amplifiers and/or power amplifiers) or any other desired radio-frequency circuitry. If desired, front end circuits 58 may include switching circuitry that is configured to selectively couple antennas 40-1, 40-2, 40-3, and 40-4 to different respective transceivers 38-1, 38-2, 38-3, and 38-4 (e.g., so that each antenna can handle communications for different transceivers 38 over time based on the state of the switching circuits in front end circuits 58).

If desired, front end circuits 58 may include filtering circuitry (e.g., duplexers and/or diplexers) that allow the corresponding antenna 40 to transmit and receive radio-frequency signals at the same time (e.g., using a frequency domain duplexing (FDD) scheme). Antennas 40-1, 40-2, 40-3, and 40-4 may transmit and/or receive radio-frequency signals in respective time slots or two or more of antennas 40-1, 40-2, 40-3, and 40-4 may transmit and/or receive radio-frequency signals concurrently. In general, any desired combination of transceivers 38-1, 38-2, 38-3, and 38-4 may transmit and/or receive radio-frequency signals using the corresponding antenna 40 at a given time. In one suitable arrangement, each of transceivers 38-1, 38-2, 38-3, and 38-4 may receive radio-frequency signals while a given one of transceivers 38-1, 38-2, 38-3, and 38-4 transmits radio-frequency signals at a given time.

Amplifier circuitry such as one or more power amplifiers may be interposed on transmission lines 50 and/or formed within transceiver circuitry 26 for amplifying radio-frequency signals output by transceivers 38 prior to transmission over antennas 40. Amplifier circuitry such as one or more low noise amplifiers may be interposed on transmission lines 50 and/or formed within transceiver circuitry 26 for amplifying radio-frequency signals received by antennas 40 prior to conveying the received signals to transceivers 38.

In the example of FIG. 4, separate front end circuits 58 are formed on each transmission line 50. This is merely illustrative. If desired, two or more transmission lines 50 may share the same front end circuits 58 (e.g., front end circuits 58 may be formed on the same substrate, module, or integrated circuit).

Each of transceivers 38 may, for example, include circuitry for converting baseband signals received from baseband processor 62 over paths 63 into corresponding radio-frequency signals. For example, transceivers 38 may each include mixer circuitry for up-converting the baseband signals to radio-frequencies prior to transmission over antennas 40. Transceivers 38 may include digital to analog converter (DAC) and/or analog to digital converter (ADC) circuitry for converting signals between digital and analog domains. Each of transceivers 38 may include circuitry for converting radio-frequency signals received from antennas 40 over transmission lines 50 into corresponding baseband signals. For example, transceivers 38 may each include mixer circuitry for down-converting the radio-frequency signals to baseband frequencies prior to conveying the baseband signals to baseband processor 62 over paths 63.

Each transceiver 38 may be formed on the same substrate, integrated circuit, or module (e.g., transceiver circuitry 26 may be a transceiver module having a substrate or integrated circuit on which each of transceivers 38 are formed) or two or more transceivers 38 may be formed on separate substrates, integrated circuits, or modules. Baseband processor 62 and front end circuits 58 may be formed on the same substrate, integrated circuit, or module as transceivers 38 or may be formed on separate substrates, integrated circuits, or modules from transceivers 38. In another suitable arrangement, transceiver circuitry 26 may include a single transceiver 38 having four ports, each of which is coupled to a respective transmission line 50, if desired. Each transceiver 38 may include transmitter and receiver circuitry for both transmitting and receiving radio-frequency signals. In another suitable arrangement, one or more transceivers 38 may perform only signal transmission or signal reception (e.g., one or more of circuits 38 may be a dedicated transmitter or dedicated receiver).

In the example of FIG. 4, antennas 40-1 and 40-4 may occupy a larger space (e.g., a larger area or volume within device 10) than antennas 40-2 and 40-3. This may allow antennas 40-1 and 40-4 to support communications at longer wavelengths (i.e., lower frequencies) than antennas 40-2 and 40-3. This is merely illustrative and, if desired, each of antennas 40-1, 40-2, 40-3, and 40-4 may occupy the same volume or may occupy different volumes. Antennas 40-1, 40-2, 40-3, and 40-4 may be configured to convey radio-frequency signals in at least one common frequency band. If desired, one or more of antennas 40-1, 40-2, 40-3, and 40-4 may handle radio-frequency signals in at least one frequency band that is not covered by one or more of the other antennas in device 10.

If desired, each antenna 40 and each transceiver 38 may handle radio-frequency communications in multiple frequency bands (e.g., multiple cellular telephone communications bands). For example, transceiver 38-1, antenna 40-1, transceiver 38-4, and antenna 40-4, may handle radio-frequency signals in a first frequency band such as a cellular low band between 600 and 960 MHz, a second frequency band such as a cellular low-midband between 1410 and 1510 MHz, a third frequency band such as a cellular midband between 1700 and 2200 MHz, a fourth frequency band such as a cellular high band between 2300 and 2700 MHz, and/or a fifth frequency band such as a cellular ultra-high band between 3400 and 3600 MHz. Transceiver 38-2, antenna 40-2, transceiver 38-3, and antenna 40-3 may handle radio-frequency signals in some or all of these bands (e.g., in scenarios where the volume of antennas 40-3 and 40-2 is large enough to support frequencies in the low band).

The example of FIG. 4 is merely illustrative. In general, antennas 40 may cover any desired frequency bands. Transceiver circuitry 26 may include other transceiver circuits such as one or more circuits 36 or 24 of FIG. 2 coupled to one or more antennas 40. Housing 12 may have any desired shape. Antennas 40 may be formed at any desired locations within housing 12. Forming each of antennas 40-1 through 40-4 at different corners of housing 12 may, for example, maximize the multi-path propagation of wireless data conveyed by antennas 40 to optimize overall data throughput for wireless communications circuitry 34.

When operating using a single antenna 40, a single stream of wireless data may be conveyed between device 10 and external communications equipment (e.g., one or more other wireless devices such as wireless base stations, access points, cellular telephones, computers, etc.). This may impose an upper limit on the data rate (data throughput) obtainable by wireless communications circuitry 34 in communicating with the external communications equipment. As software applications and other device operations increase in complexity over time, the amount of data that needs to be conveyed between device 10 and the external communications equipment typically increases, such that a single antenna 40 may not be capable of providing sufficient data throughput for handling the desired device operations.

In order to increase the overall data throughput of wireless communications circuitry 34, multiple antennas 40 may be operated using a multiple-input and multiple-output (MIMO) scheme. When operating using a MIMO scheme, two or more antennas 40 on device 10 may be used to convey multiple independent streams of wireless data at the same frequency. This may significantly increase the overall data throughput between device 10 and the external communications equipment relative to scenarios where only a single antenna 40 is used. In general, the greater the number of antennas 40 that are used for conveying wireless data under the MIMO scheme, the greater the overall throughput of wireless communications circuitry 34.

In order to perform wireless communications under a MIMO scheme, antennas 40 need to convey data at the same frequencies. If desired, wireless communications circuitry 34 may perform so-called two-stream (2X) MIMO operations (sometimes referred to herein as 2X MIMO communications or communications using a 2× MIMO scheme) in which two antennas 40 are used to convey two independent streams of radio-frequency signals at the same frequency. Wireless communications circuitry 34 may perform so-called four-stream (4X) MIMO operations (sometimes referred to herein as 4× MIMO communications or communications using a 4× MIMO scheme) in which four antennas 40 are used to convey four independent streams of radio-frequency signals at the same frequency. Performing 4× MIMO operations may support higher overall data throughput than 2× MIMO operations because 4× MIMO operations involve four independent wireless data streams whereas 2× MIMO operations involve only two independent wireless data streams. If desired, antennas 40-1, 40-2, 40-3, and 40-4 may perform 2× MIMO operations in some frequency bands and may perform 4× MIMO operations in other frequency bands (e.g., depending on which bands are handled by which antennas). Antennas 40-1, 40-2, 40-3, and 40-4 may perform 2× MIMO operations in some bands concurrently with performing 4× MIMO operations in other bands, for example.

As one example, antennas 40-1 and 40-4 (and the corresponding transceivers 38-1 and 38-4) may perform 2× MIMO operations by conveying radio-frequency signals at the same frequency in a cellular low band between 600 MHz and 960 MHz. At the same time, antennas 40-1, 40-2, 40-3, and 40-4 may collectively perform 4× MIMO operations by conveying radio-frequency signals at the same frequency in a cellular midband between 1700 and 2200 MHz and/or at the same frequency in a cellular high band (HB) between 2300 and 2700 MHz (e.g., antennas 40-1 and 40-4 may perform 2× MIMO operations in the low band concurrently with performing 4× MIMO operations in the midband and/or high band). This example is merely illustrative and, in general, any desired number of antennas may be used to perform any desired MIMO operations in any desired frequency bands.

If desired, antennas 40-1 and 40-2 may include switching circuitry that is adjusted by control circuitry (e.g., control circuitry 28 of FIG. 3). Control circuitry 28 may control the switching circuitry in antennas 40-1 and 40-2 to configure antenna structures in antennas 40-1 and 40-2 to form a single antenna 40U in region 22 of device 10. Similarly, antennas 40-3 and 40-4 may include switching circuitry that is adjusted by control circuitry 28. Control circuitry 28 may control the switching circuitry in antennas 40-3 and 40-4 to form a single antenna 40L (e.g., an antenna 40L that includes antenna structures from antennas 40-3 and 40-4) in region 20 of device 10. Antenna 40U may, for example, be formed at an upper end of housing 12 and may therefore sometimes be referred to herein as upper antenna 40U. Antenna 40L may be formed at an opposing lower end of housing 12 and may therefore sometimes be referred to herein as lower antenna 40L. When antennas 40-1 and 40-2 are configured to form upper antenna 40U and antennas 40-3 and 40-4 are configured to form lower antenna 40L, wireless communications circuitry 34 may perform 2× MIMO operations using antennas 40U and 40L in any desired frequency bands. If desired, control circuitry 28 may toggle the switching circuitry over time to switch wireless communications circuitry 34 between a first mode in which antennas 40-1, 40-2, 40-3, and 40-4 perform 2× MIMO operations in any desired frequency bands and 4× MIMO operations in any desired frequency bands and a second mode in which antennas 40-1, 40-2, 40-3, and 40-4 are configured to form antennas 40U and 40L that perform 2× MIMO operations in any desired frequency bands.

If desired, wireless communications circuitry 34 may convey wireless data with multiple antennas on one or more external devices (e.g., multiple wireless base stations) in a scheme sometimes referred to as carrier aggregation. When operating using a carrier aggregation scheme, the same antenna 40 may convey radio-frequency signals with multiple antennas (e.g., antennas on different wireless base stations) at different respective frequencies (sometimes referred to herein as carrier frequencies, channels, carrier channels, or carriers). For example, antenna 40-1 may receive radio-frequency signals from a first wireless base station at a first frequency, from a second wireless base station at a second frequency, and a from a third base station at a third frequency. The received signals at different frequencies may be simultaneously processed (e.g., by transceiver 38-1) to increase the communications bandwidth of transceiver 38-1, thereby increasing the data rate of transceiver 38-1. Similarly, antennas 40-1, 40-2, 40-3, and 40-4 may perform carrier aggregation at two, three, or more than three frequencies within any desired frequency bands. This may serve to further increase the overall data throughput of wireless communications circuitry 34 relative to scenarios where no carrier aggregation is performed. For example, the data throughput of circuitry 34 may increase for each carrier frequency that is used (e.g., for each wireless base station that communicates with each of antennas 40-1, 40-2, 40-3, and 40-4).

By performing communications using both a MIMO scheme and a carrier aggregation scheme, the data throughput of wireless communications circuitry 34 may be even greater than in scenarios where either a MIMO scheme or a carrier aggregation scheme is used. The data throughput of circuitry 34 may, for example, increase for each carrier frequency that is used by antennas 40 (e.g., each carrier frequency may contribute 40 megabits per second (Mb/s) or some other throughput to the total throughput of wireless communications circuitry 34). As one example, antennas 40-1 and 40-4 may perform carrier aggregation across three frequencies within each of the cellular low band, midband, and high band and antennas 40-3 and 40-4 may perform carrier aggregation across three frequencies within each of the cellular midband and high band. At the same time, antennas 40-1 and 40-4 may perform 2× MIMO operations in the cellular low band and antennas 40-1, 40-2, 40-3, and 40-4 may perform 4× MIMO operations in one of cellular midband and the cellular high band. In this scenario, with an exemplary throughput of 40 Mb/s per carrier frequency, wireless communications circuitry 34 may exhibit a throughput of approximately 960 Mb/s. If 4× MIMO operations are performed in both the cellular midband and the cellular high band by antennas 40-1, 40-2, 40-3, and 40-4, wireless communications circuitry 34 may exhibit an even greater throughput of approximately 1200 Mb/s. In other words, the data throughput of wireless communications circuitry 34 may be increased from the 40 Mb/s associated with conveying signals at a single frequency with a single antenna to approximately 1 gigabits per second (Gb/s) by performing communications using MIMO and carrier aggregation schemes using four antennas 40-1, 40-2, 40-3, and 40-4.

These examples are merely illustrative and, if desired, carrier aggregation may be performed in fewer than three carriers per band, may be performed across different bands, or may be omitted for one or more of antennas 40-1 through 40-4. The example of FIG. 4 is merely illustrative. If desired, antennas 40 may cover any desired number of frequency bands at any desired frequencies. More than four antennas 40 or fewer than four antennas 40 may perform MIMO and/or carrier aggregation operations at non-near-field communications frequencies if desired.

Antennas 40 may include slot antenna structures, inverted-F antenna structures (e.g., planar and non-planar inverted-F antenna structures), loop antenna structures, combinations of these, or other antenna structures. An illustrative inverted-F antenna structure is shown in FIG. 5.

Figure 5:
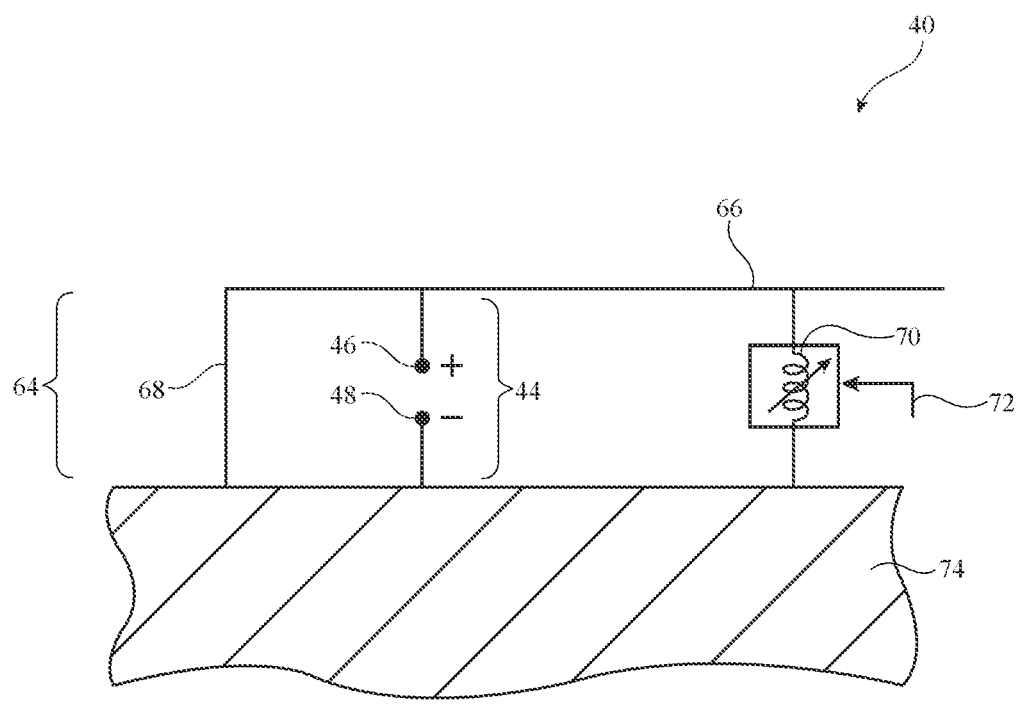
FIG. 5 is a schematic diagram of an illustrative inverted-F antenna in accordance with an embodiment.

When using an inverted-F antenna structure as shown in FIG. 5, antenna 40 may include an antenna resonating element 64 (sometimes referred to herein as antenna radiating element 64) and antenna ground 74 (sometimes referred to herein as ground plane 74 or ground 74). Antenna resonating element 64 may have a main resonating element arm such as resonating element arm 66. The length of resonating element arm 66 may be selected so that antenna 40 resonates at desired operating frequencies. For example, the length of resonating element arm 66 (or a branch of resonating element arm 66) may be approximately one-quarter of the wavelength corresponding to a desired operating frequency for antenna 40. Antenna 40 may also exhibit resonances at harmonic frequencies. If desired, slot antenna structures or other antenna structures may be incorporated into an inverted-F antenna such as antenna 40 of FIG. 5 (e.g., to enhance antenna response in one or more communications bands).

Resonating element arm 66 may be coupled to antenna ground 74 by return path 68. Antenna feed 44 may include positive antenna feed terminal 46 and ground antenna feed terminal 48 and may run parallel to return path 68 between resonating element arm 66 and antenna ground 74. If desired, antenna 40 may have more than one resonating element arm branch (e.g., to create multiple frequency resonances to support operations in multiple communications bands) or may have other antenna structures (e.g., parasitic antenna resonating elements, tunable components to support antenna tuning, etc.). For example, resonating element arm 66 may have left and right branches that extend outwardly from antenna feed 44 and return path 68. If desired, multiple feeds may be used to feed antennas such as antenna 40. Resonating element arm 66 may follow any desired path having any desired shape (e.g., curved and/or straight paths, meandering paths, etc.).

If desired, antenna 40 may include one or more adjustable circuits (e.g., tunable components 42 of FIG. 3) that are coupled to resonating element arm 66. As shown in FIG. 5, for example, tunable components such as adjustable inductor 70 may be coupled between antenna resonating element structures in antenna 40 such as resonating element arm 66 and antenna ground 74 (i.e., adjustable inductor 70 may bridge the gap between resonating element arm 66 and antenna ground 74). Adjustable inductor 70 may exhibit an inductance value that is adjusted in response to control signals 72 provided to adjustable inductor 70 from control circuitry 28 (FIG. 3).

Figure 6:
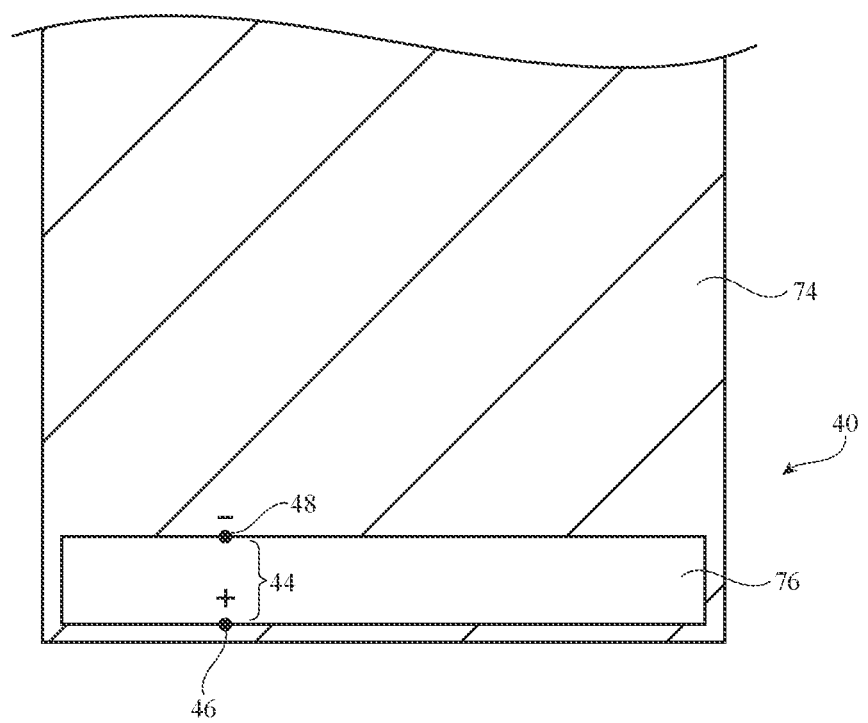
FIG. 6 is a schematic diagram of an illustrative slot antenna in accordance with an embodiment.

Antenna 40 may be a hybrid antenna that includes one or more slot elements. As shown in FIG. 6, for example, antenna 40 may be based on a slot antenna configuration having an opening such as slot 76 that is formed within conductive structures such as antenna ground 74. Slot 76 may be filled with air, plastic, and/or other dielectric. The shape of slot 76 may be straight or may have one or more bends (i.e., slot 76 may have an elongated shape following a meandering path). Feed terminals 48 and 46 may, for example, be located on opposing sides of slot 76 (e.g., on opposing long sides). Slot 76 may sometimes be referred to herein as slot element 76, slot antenna resonating element 76, slot antenna radiating element 76, or slot radiating element 76. Slot-based radiating elements such as slot 76 of FIG. 6 may give rise to an antenna resonance at frequencies in which the wavelength of the antenna signals is approximately equal to the perimeter of the slot. In narrow slots, the resonant frequency of slot 76 is associated with signal frequencies at which the slot length is approximately equal to a half of a wavelength of operation.

The frequency response of antenna 40 can be tuned using one or more tuning components (e.g., tunable components 42 of FIG. 3). These components may have terminals that are coupled to opposing sides of slot 76 (i.e., the tunable components may bridge slot 76). If desired, tunable components may have terminals that are coupled to respective locations along the length of one of the sides of slot 76. Combinations of these arrangements may also be used. If desired, antenna 40 may be a hybrid slot-inverted-F antenna that includes resonating elements of the type shown in both FIG. 5 and FIG. 6 (e.g., having resonances given by both a resonating element arm such as resonating element arm 66 of FIG. 5 and a slot such as slot 76 of FIG. 6).

The example of FIG. 6 is merely illustrative. In general, slot 76 may have any desired shape (e.g., shapes with straight and/or curved edges), may follow a meandering path, etc. If desired, slot 76 may be an open slot having one or more ends that are free from conductive material (e.g., where slot 76 extends through one or more sides of antenna ground 74). Slot 76 may, for example, have a length approximately equal to one-quarter of the wavelength of operation in these scenarios.

If desired, each of antennas 40-1, 40-2, 40-3, and 40-4 (FIG. 4) may be formed using hybrid slot-inverted-F antenna structures that includes resonating elements of the types shown in FIGS. 5 and 6. Each of these antennas may be formed using a portion of the housing for electronic device 10. A top interior view of device 10 showing how antennas 40-1, 40-2, 40-3, and 40-4 may be integrated within the housing for electronic device 10 is shown in FIG. 7.

Figure 7:
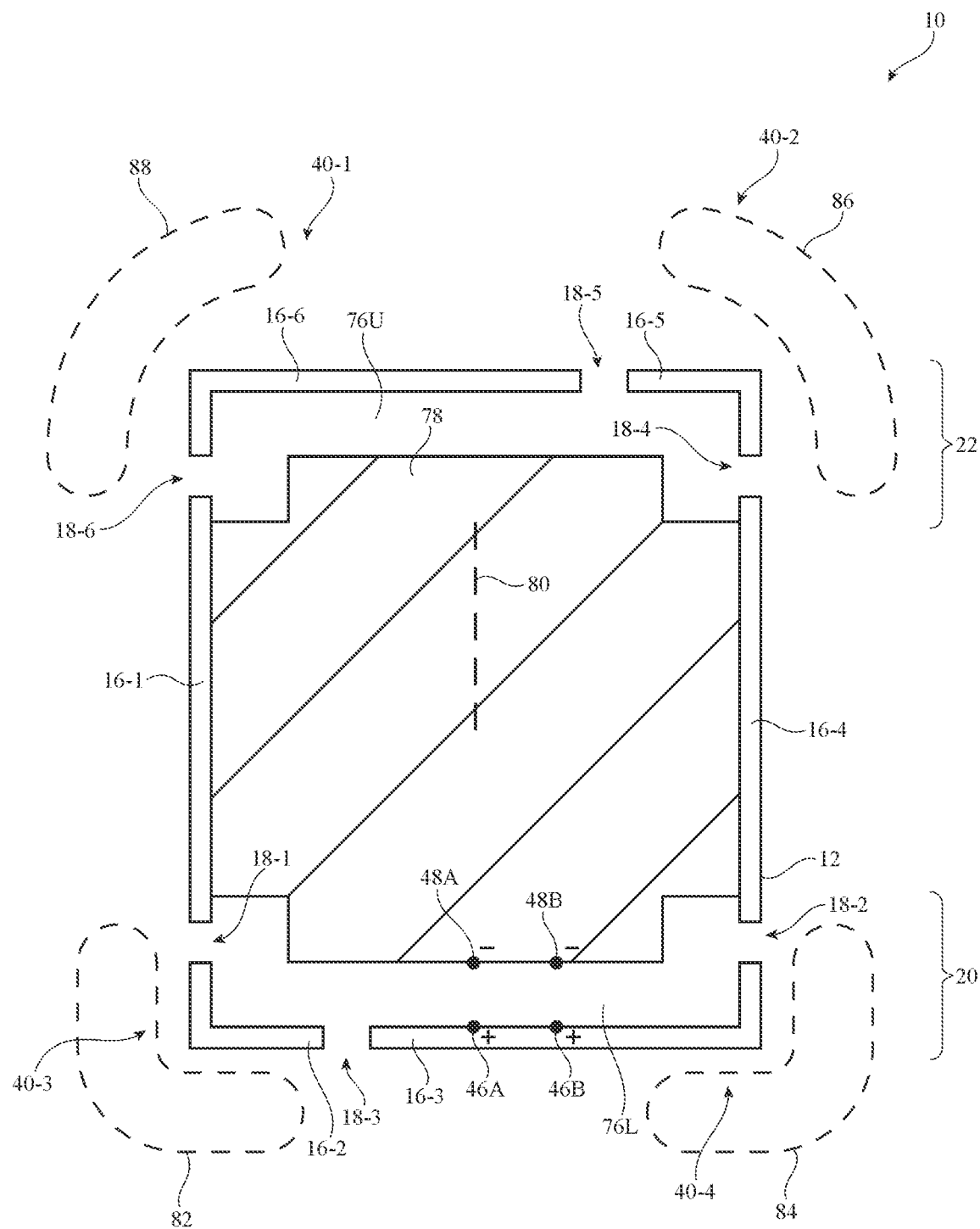
FIG. 7 is a top view of illustrative antennas formed from housing structures in an electronic device in accordance with an embodiment.

As shown in FIG. 7, peripheral conductive housing structures 16 may be segmented (divided) by dielectric-filled gaps 18 (e.g., plastic gaps) that divide peripheral conductive housing structures 16 into segments. Gaps 18 may include a first gap 18-1, a second gap 18-2, a third gap 18-3, a fourth gap 18-4, a fifth gap 18-5, and a sixth gap 18-6. Gaps 18-6 and 18-1 may be formed on the left side of device 10, gaps 18-4 and 18-2 may be formed on the right side of device 10, gap 18-3 may be formed on the bottom side of device 10, and gap 18-5 may be formed on the top side of device 10. Gap 18-6 may separate a first segment 16-1 of peripheral conductive housing structures 16 from a sixth segment 16-6 of peripheral conductive housing structures. Gap 18-5 may separate sixth segment 16-6 from a fifth segment 16-5 of peripheral conductive housing structures 16. Gap 18-4 may separate fifth segment 16-5 from a fourth segment 16-4 of peripheral conductive housing structures 16. Gap 18-2 may separate fourth segment 16-4 of peripheral conductive housing structures 16 from a third segment 16-3 of peripheral conductive housing structures 16. Gap 18-3 may separate third segment 16-3 from second segment 16-2 of peripheral conductive housing structures 16. Gap 18-1 may separate second segment 16-2 from first segment 16-1 of peripheral conductive housing structures 16.

The resonating element for antenna 40-4 may include an inverted-F antenna resonating element arm (e.g., resonating element arm 66 of FIG. 5) that is formed from segment 16-3. The resonating element for antenna 40-3 may include an inverted-F antenna resonating element arm that is formed from segment 16-2. Similarly, the resonating element for antenna 40-2 may include an inverted-F antenna resonating element arm that is formed from segment 16-5 and the resonating element for antenna 40-1 may include an inverted-F antenna resonating element arm that is formed from segment 16-6. Segments 16-6 and 16-5 may be separated from ground structures 78 by slot 76U (e.g., a radiating slot 76 as shown in FIG. 6). Segments 16-2 and 16-3 may be separated from ground structures 78 by slot 76L (e.g., a radiating slot 76 as shown in FIG. 6). Air and/or other dielectric may fill slots 76U and 76L.

Each antenna may include one or more antenna feeds (e.g., antenna feed 44 of FIGS. 3, 5, and 6) coupled across the corresponding slot. In the example of FIG. 7, lower antenna 40-4 includes two antenna feeds coupled across slot 76L (e.g., a first antenna feed having a positive antenna feed terminal 46A coupled to segment 16-3 and a ground antenna feed terminal 48A coupled to ground structures 78, as well as a second antenna feed having a positive antenna feed terminal 46B coupled to segment 16-3 and a ground antenna feed terminal 48B coupled to ground structures 78). This example is merely illustrative. Antenna 40-4 may have only one antenna feed or more than three antenna feeds if desired. While antennas 40-1, 40-2, and 40-3 are shown in the example of FIG. 7 without antenna feeds for the sake of clarity, antennas 40-1, 40-2, and 40-3 may each have any desired number of antenna feeds (e.g., one antenna feed, two antenna feeds, or more than two antenna feeds). Each antenna feed may be selectively activated at a given time (e.g., using switching circuitry and/or by selectively activating different ports of transceiver circuitry 26 of FIG. 3).

Ground structures 78 may include one or more planar metal layers such as a metal layer used to form a rear housing wall for device 10, a metal layer that forms an internal support structure for device 10, conductive traces on a printed circuit board, and/or any other desired conductive layers in device 10. Ground structures 78 may extend from segment 16-1 to segment 16-4 of peripheral conductive housing structures 16. Ground structures 78 may be coupled to segments 16-1 and 16-4 using conductive adhesive, solder, welds, conductive screws, conductive pins, and/or any other desired conductive interconnect structures. If desired, ground structures 78 and segments 16-1 and 16-4 may be formed from different portions of a single integral conductive structure (e.g., a conductive housing for device 10).

Ground structures 78 need not be confined to a single plane and may, if desired, include multiple layers located in different planes or non-planar structures. Ground structures 78 may include conductive (e.g., grounded) portions of other electrical components within device 10. For example, ground structures 78 may include conductive portions of display 14 (FIG. 1). Conductive portions of display 14 may include a metal frame for display 14, a metal backplate for display 14, shielding layers or shielding cans for display 14, pixel circuitry in display 14, touch sensor circuitry (e.g., touch sensor electrodes) for display 14, and/or any other desired conductive structures in display 14 or used for mounting display 14 to the housing for device 10.

Ground structures 78 and segments 16-1 and 16-4 may form portions of antenna ground 74 (FIGS. 5 and 6) for antennas 40-1, 40-2, 40-3, and 40-4. If desired, slot 76L may be configured to form slot antenna resonating element structures that contribute to the overall performance of antennas 40-3 and/or 40-4. Slot 76L may extend from gap 18-1 to gap 18-2 (e.g., the ends of slot 76L which may sometimes be referred to as open ends, may be formed by gaps 18-1 and 18-2). Slot 76L may have an elongated shape having any suitable length (e.g., about 4-20 cm, more than 2 cm, more than 4 cm, more than 8 cm, more than 12 cm, less than 25 cm, less than 10 cm, etc.) and any suitable width (e.g., approximately 2 mm, less than 2 mm, less than 3 mm, less than 4 mm, 1-3 mm, etc.). Gap 18-3 may be continuous with and extend perpendicular to the longitudinal axis of the longest a portion of slot 76L (e.g., the portion of slot 76 extending from the left to the right of FIG. 7). If desired, slot 76L may include vertical portions that extend parallel to longitudinal axis 80 of device 10 and beyond gaps 18-1 and 18-2.

Similarly, slot 76U may be configured to form slot antenna resonating element structures that contribute to the overall performance of antennas 40-1 and/or 40-2. Slot 76U may extend from gap 18-6 to gap 18-4 (e.g., the ends of slot 76U may be formed by gaps 18-6 and 18-4). Slot 76U may have an elongated shape having any suitable length (e.g., about 4-20 cm, more than 2 cm, more than 4 cm, more than 8 cm, more than 12 cm, less than 25 cm, less than 10 cm, etc.) and any suitable width (e.g., approximately 2 mm, less than 2 mm, less than 3 mm, less than 4 mm, 1-3 mm, etc.). Gap 18-5 may be continuous with and extend perpendicular to the longitudinal axis of the longest a portion of slot 76U. If desired, slot 76U may include vertical portions that extend parallel to longitudinal axis 80 of device 10 and beyond gaps 18-6 and 18-4 (e.g., towards slot 76L).

Slots 76U and 76L may be filled with dielectric such as air, plastic, ceramic, or glass. For example, plastic may be inserted into portions of slots 76U and 76L and this plastic may be flush with the exterior of the housing for device 10. Dielectric material in slot 76U may lie flush with dielectric material in gaps 18-6, 18-5, and 18-4 at the exterior of the housing 12 if desired. Dielectric material in slot 76L may lie flush with dielectric material in gaps 18-1, 18-3, and 18-2 at the exterior of the housing 12. The example of FIG. 7 in which slots 76L and 76U each have a U-shape is merely illustrative. If desired, slots 76U and 76L may have any other desired shapes (e.g., rectangular shapes, meandering shapes having curved and/or straight edges, etc.).

The presence or absence of external objects such as a user's hand or other body part in the vicinity of antennas 40-1, 40-2, 40-3, and 40-4 may affect antenna loading and therefore antenna performance. For example, in free space (e.g., the absence of external loading from external objects), each antenna may operate with satisfactory antenna efficiency. However, if care is not taken in the presence of external loading, one or more antennas may become detuned by the external loading, thereby leading to a degradation in antenna efficiency in one or more frequency bands for those antennas.

Antenna loading may differ depending on the way in which device 10 is being held. For example, antenna loading and therefore antenna performance may be affected in one way when a user is holding device 10 in the user's right hand, may be affected in another way when a user is holding device 10 in the user's left hand, and may be affected in another way when a user is holding device 10 with both hands. Because device 10 includes antennas at both lower region 20 and upper region 22 that may operate at the same frequencies under a MIMO scheme, antenna loading and therefore antenna performance may also be affected in one way when a user is holding device 10 in a portrait orientation (e.g., with region 22 pointed upwards, skywards, or away from the user's body) and may be affected in another way when a user is holding device 10 a landscape orientation (e.g., with segment 16-1 or 16-4 pointed upwards, skywards, or away from the user's body).

Other factors and combinations of these factors may also affect antenna loading and performance. In general, factors such as the hand (or hands) that a user uses to hold device 10, the orientation of device 10, how far away the user holds device 10 from their body, where the user holds device 10 during use, the type of material located adjacent to device 10, and/or other factors may affect antenna loading and therefore antenna performance for one or more of antennas 40-1, 40-2, 40-3, and 40-4. In addition, regulatory and/or industry standards may impose limits on the amount of radio-frequency energy that can be transmitted by antennas in the vicinity of different parts of the user's body (e.g., limits on the amount of radio-frequency energy absorbed by the user's body).

To accommodate various loading scenarios and such limits on absorbed radio-frequency energy, device 10 may use sensor data and other information about how device 10 is being used to detect and/or predict the presence of antenna loading adjacent to one or more of antennas 40-1, 40-2, 40-3, and 40-4. Device 10 (e.g., control circuitry 28 of FIG. 3) may then adjust antenna settings for wireless communications circuitry 34 to ensure that satisfactory antenna performance is achieved by wireless communications circuitry 34 while also satisfying any regulatory or industry-imposed limits on radio-frequency absorption. Control circuitry 28 may adjust the antenna settings by, for example, selectively activating one or more antennas 40, selectively activating one or more antenna feeds (e.g., positive antenna feed terminals such as positive antenna feed terminals 46A and 46B of FIG. 7), limiting the maximum transmit power level of the antennas, selecting desired operating frequencies, and/or adjusting tunable components of in the antennas (e.g., tunable components 42 of FIG. 3).

As shown in FIG. 7, segment 16-4 is associated with the right edge of housing 12 when device 10 is viewed from the front and segment 16-1 is associated with the left edge of housing 12 when device 10 is viewed from the front. When a user is holding device 10 in the user's right hand, the palm of the user's right hand may rest along the bottom-right edge of housing 12 such as within region 84 and the fingers of the user's right hand (which do not load the antennas as much as the user's palm) will rest along segment 16-1 of housing 12. In this situation, loading from the user's palm may deteriorate the antenna efficiency of antenna 40-4 in one or more frequency bands and/or may undesirably affect the performance of the other antennas in device 10. Similarly, when a user is holding device 10 in the user's left hand, the palm of the user's left hand may rest along the bottom-left edge of device 10 such as within region 82 and the fingers of the user's left hand will rest along segment 16-4 of device 10. In this scenario, the palm of the user's hand may load and deteriorate the antenna efficiency of antenna 40-3 in one or more frequency bands and/or may undesirably affect the performance of the other antennas in device 10.

These examples are merely illustrative of some of the possible usage scenarios for device 10. In other usage scenarios, the user may hold device 10 with both hands in a portrait orientation (e.g., where the user's palms are located in regions 82 and 84), with both hands in a landscape orientation (e.g., where the user's palms are located in regions 86 and 84 or in regions 88 and 82), with one hand in a landscape orientation, or in other manners. When a user holds device 10 to their ear, the user's ear, head, or other parts of the user's body may load one or more antennas in device 10 (e.g., from region 88 and/or region 86). These environmental factors affecting the loading of antennas 40 in device 10 (e.g., from external objects at or adjacent to the exterior of device 10) may sometimes be referred to herein as the operating environment for device 10.

Control circuitry 28 (FIG. 3) may monitor the operating environment for device 10 during use. Control circuitry 28 may control the antenna settings for wireless communications circuitry 34 based on the monitored operating environment to ensure that one or more antennas (e.g., at least two antennas for performing MIMO operations) operate with satisfactory antenna efficiency in one or more frequency bands of interest. At the same time, control circuitry 28 may also adjust the antenna settings for wireless communications circuitry 34 to ensure that device 10 satisfies any applicable limits on absorbed radio-frequency energy regardless of operating environment.

Figure 8:
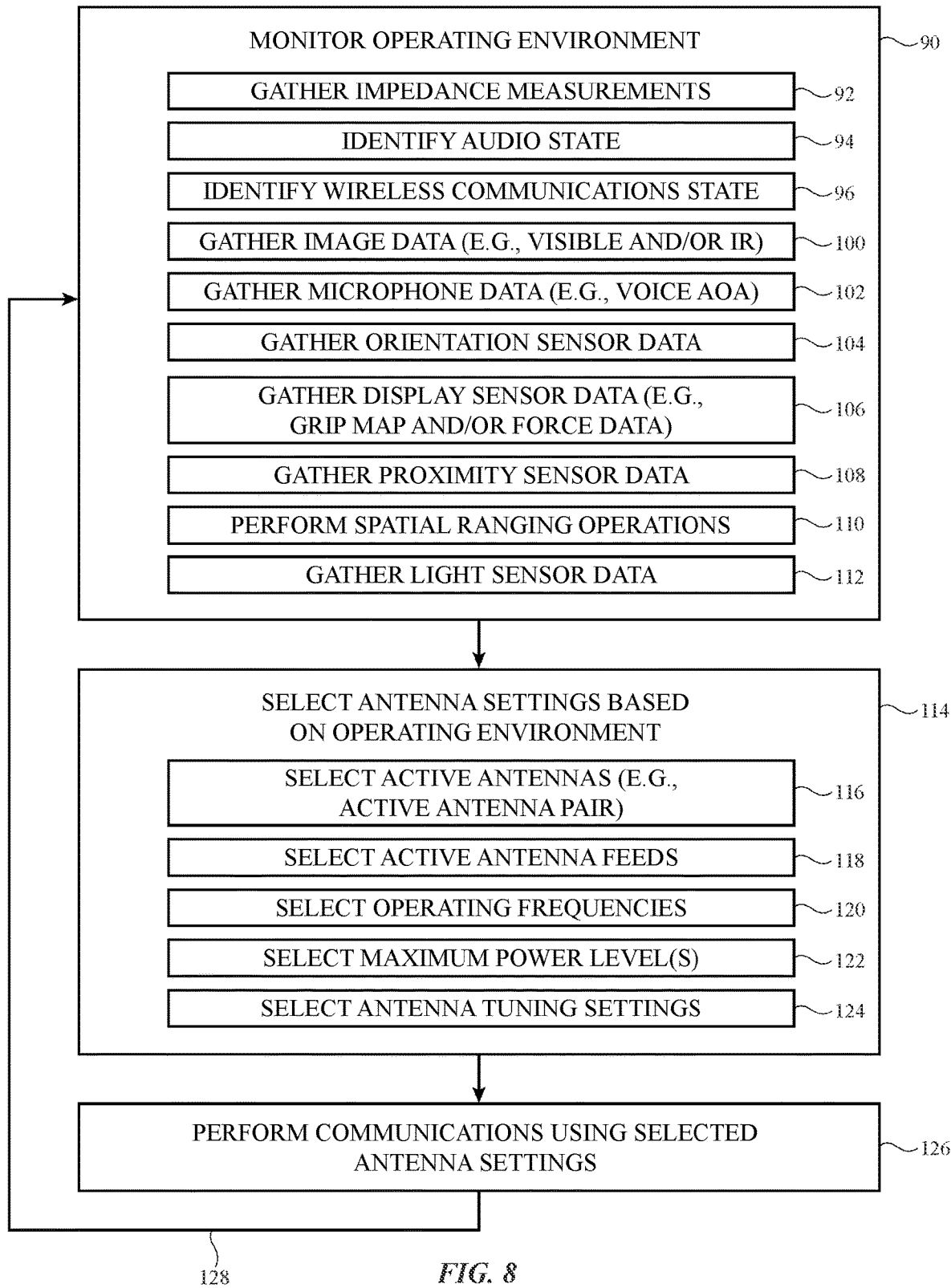
FIG. 8 is a flow chart of illustrative steps that may be involved in adjusting wireless communications circuitry based on sensor data and other data in accordance with an embodiment.

FIG. 8 is a flow chart of illustrative steps involved in operating wireless communications circuitry 34 to ensure that antennas 40 exhibit satisfactory performance (e.g., antenna efficiency) while also meeting limits on absorbed radio-frequency energy regardless of operating environment.

At step 90, control circuitry 28 may monitor the operating environment of device 10. Control circuitry 28 may monitor the operating environment by gathering sensor data using sensors on device 10 (e.g., sensors from input-output devices 32 of FIG. 2). For example, at step 92, control circuitry 28 may gather antenna impedance measurements for antennas 40-1, 40-2, 40-3, and/or 40-4 using impedance sensors such as impedance sensor 55 of FIG. 3. The impedance measurements may include radio-frequency phase and magnitude data (e.g., radio-frequency phase and magnitude data associated with transmitted, received, and/or reflected radio-frequency signals) and may sometimes referred to herein as impedance data, impedance values, or impedance information.

The impedance measurements may, for example, be indicative of external objects located in the vicinity of antenna 40-1, 40-2, 40-3, and/or 40-4. Control circuitry 28 may process the impedance measurements to identify how device 10 is being used or held by a user (e.g., to help identify the operating environment for device 10). For example, if control circuitry 28 detects that only antennas 40-4 and 40-2 (FIG. 7) are being heavily loaded based on the impedance measurements, control circuitry 28 may determine that device 10 is being held in a landscape orientation with both of the user's hands (e.g., hands within regions 84 and 86 of FIG. 7). As another example, if control circuitry 28 detects that only antenna 40-3 is being heavily loaded using the impedance measurements, control circuitry 28 may determine that device 10 is being held in a portrait orientation with the user's left hand. These examples are merely illustrative and, in general, the impedance measurement is indicative of any loading of antennas 40-1, 40-2, 40-3, and 40-4.

Control circuitry 28 may gather image data (e.g., one or more images that includes an array of pixel values or other image signals) using one or more image sensors on device 10 (step 100). The image sensors may include visible light image sensors that capture visible light image data using visible light-sensitive image sensor pixels, infrared light image sensors that capture infrared image data using infrared light-sensitive image sensor pixels, image sensors that capture image data in response to both visible and infrared light, or other suitable image sensors. The image sensors may be integrated into one or more camera modules (e.g., cameras) mounted within housing 12. The image sensors may include first and second image sensors (so-called front-facing image sensors or front-facing cameras) mounted at the front face of device 10 (e.g., within inactive region IA of display 14 of FIG. 1) and third and fourth image sensors mounted at the rear face of device 10 (a so-called rear-facing image sensors or rear-facing cameras). This example is merely illustrative and device 10 may, in general, include any desired number of image sensors.

In one suitable arrangement, input-output devices 32 (FIG. 2) may include light sources mounted to the front face of device 10 (e.g., within inactive region IA of display 14 of FIG. 1). The light sources may emit light at infrared wavelengths or other wavelengths that is reflected off of objects (e.g., the face of a user) and back towards device 10. The light sources may, for example, include a flood illuminator and a dot projector. The dot projector may, for example, emit a grid, array, matrix, or other pattern of light dots (e.g., dots of light at infrared wavelengths) that are reflected off of objects facing display 14. One or more of the front-facing image sensors may generate image data in response to this reflected light. Control circuitry 28 may process this image data (sometimes referred to herein as face image data, front-facing image data, or facial recognition image data) to identify facial features of the user (or other persons or objects that reflected the emitted light towards device 10). The facial recognition image data may include a depth map that maps three-dimensional depth of the scene in front of display 14 (e.g., that maps a distance between objects in the scene in front of display 14 and display 14). Control circuitry 28 may use the identified facial features to authenticate the identity of the user of device 10. For example, if the identified facial features match those of an authorized user stored on control circuitry 28, control circuitry 28 may unlock device 10 or may otherwise authorize or unlock software and/or hardware features on device that are only available to authorized users. Control circuitry 28 may perform image processing operations such as object detection and recognition operations on visible and/or infrared image data captured using the image sensors in device 10.

The image data may, for example, be indicative of how device 10 is being used or held by a user. Control circuitry 28 may process the image data to help identify how device 10 is being used or held by a user (e.g., to help identify the operating environment for device 10). For example, if control circuitry 28 determines that a user's face is currently facing display 14 using the facial recognition image data (or using image data captured using a visible light front-facing image sensor), control circuitry 28 may determine that device 10 is not being held against the user's ear. Similarly, if control circuitry 28 determines that the user's left ear is facing display 14 using the facial recognition image data or other image data captured using the front facing image sensors, control circuitry 28 may determine that device 10 is being held against the user's left ear (e.g., with the user's left hand). If control circuitry 28 determines that the user's right ear is facing display 14 using the facial recognition image data or other image data captured using the front facing image sensors, control circuitry 28 may determine that device 10 is being held against the user's right ear (e.g., with the user's right hand). These examples are merely illustrative and, in general, control circuitry 28 may process the image data in any desired manner.

If desired, control circuitry 28 may gather audio data (e.g., microphone data) using audio sensors such as one or more microphones in device 10 (step 102). The microphone data may include voice data generated by the voice of the user. If desired, device 10 may include multiple microphones that each generate microphone data. Control circuitry 28 may process the relative magnitude (volume) of voice data in the microphone data gathered by each microphone and/or time delays in the voice data between each of the microphones to help identify a relative angle between the user's mouth and device 10 (e.g., an angle of arrival of the voice in the microphone data). Control circuitry 28 may use this angle of arrival to help determine the operating environment for device 10. For example, control circuitry 28 may use this angle of arrival to determine whether the user is holding device 10 against the side of their head or if the user is holding device 10 away from their head.

If desired, control circuitry 28 may gather position and orientation sensor data using position and orientation sensors (e.g., sensors such as accelerometers, gyroscopes, and compasses) (step 104). The position and orientation sensor data may, if desired, include motion sensor data associated with how device 10 is moving over time. Control circuitry 28 may process the position and orientation sensor data to help identify the operating environment for device 10. For example, if control circuitry 28 determines from the position and orientation sensor data that display 14 is facing upwards, control circuitry 28 may determine that device 10 is not being held against a user's head.

If desired, control circuitry 28 may gather display sensor data using sensor circuitry in display 14 (step 106). The display sensor data may include touch sensor data and/or force sensor data. The display may include touch sensor circuitry for generating the touch sensor data and, if desired, may include force sensor circuitry for generating the force sensor data. The touch sensor circuitry may include, for example, capacitive and/or resistive touch sensor electrodes integrated within display 14 (FIG. 1). The force sensor circuitry may include any desired force or pressure sensor circuitry for detecting how hard a user is pressing down onto display 14 (e.g., at one or more locations across the face of display 14).

In one suitable arrangement, the display sensor data may include a grip map that maps each of the locations across the face of display 14 that are being contacted by the user's hand at any given time. The grip map may include, for example, multiple points in scenarios where the user's hand contacts display 14 at multiple points at once. If desired, the grip map may also include force sensor data indicative of how hard the user is pressing down at each of these locations. The grip map may, for example, be an array that includes entries (e.g., rows) for each contact location across the lateral face of display 14 at a given time. Each entry may include the X and Y locations across the lateral face of display 14 that are being contacted as well as a force sensor data value indicative of the amount of pressure with which that contact is being applied to display 14, for example.

Control circuitry 28 may process the grip sensor data to help identify the operating environment for device 10. For example, control circuitry 28 may determine which hand is being used to hold device 10 and/or the location of that hand on housing 12 based on the locations and/or force with which the user's hand is contacting the surface of display 14. If desired, control circuitry 28 may store predetermined (calibrated) grip maps that are associated with different known ways of holding device 10. Control circuitry 28 may identify predetermined grip maps that the match gathered grip maps to identify how the user is holding device 10.

If desired, control circuitry 28 may gather proximity sensor data using a proximity sensor such as a capacitive proximity sensor (step 108). The proximity sensor data may be indicative of how close an external object is located to the proximity sensor and thus to device 10. In one suitable arrangement, the proximity sensor may be located at the front face of device 10 (e.g., within inactive area IA of display 14 of FIG. 1). Control circuitry 28 may process the proximity sensor data to help identify the operating environment for device 10. For example, if control circuitry 28 determines from the proximity sensor data that an external object is in very close proximity (e.g., within a predetermined distance) of the proximity sensor, control circuitry 28 may determine that a user is holding device 10 to their ear.

If desired, control circuitry 28 may gather light sensor data using light sensors such as one or more ambient light sensors (step 112). The light sensor data may be indicative of the brightness or darkness of the immediate surroundings of device 10. Device 10 may include a light sensor at the front face of device 10 and/or a light sensor at the rear face of device 10. Control circuitry 28 may process the light sensor data to help identify the operating environment for device 10. For example, if control circuitry 28 determines from the light sensor data that the surroundings of device 10 are bright, control circuitry 28 may determine that device 10 is not located within the user's pocket and/or that device 10 is not being held against the user's ear.

If desired, control circuitry 28 may perform spatial ranging operations to monitor the operating environment of device 10 (step 110). Control circuitry 28 may control transceiver circuitry in device 10 to perform spatial ranging operations using one or more desired antennas 40 (e.g., antennas 40-1, 40-2, 40-3, or 40-4 of FIG. 4 or other antennas in device 10). Spatial ranging operations may involve one-way communications that do not require external communications equipment. The spatial ranging operations may include range detection operations, external object detection operations, and/or external object tracking operations, for example.

In performing spatial ranging operations, the transceiver circuitry may transmit a signal such as a sequence (e.g., series) of pulses or other predetermined signals at radio frequencies using a corresponding antenna 40 (e.g., based on a RADAR protocol or other range or object detection protocol). The transceiver circuitry may then wait for receipt of a reflected version of the transmitted signal that has been reflected off of an external object in the vicinity of device 10 (e.g., within a line-of-sight of device 10). Upon receiving the reflected version of the transmitted signal, the transceiver circuitry or control circuitry 28 may compare the transmitted signal (e.g., the sequence of pulses in the transmitted signal) to the received reflected version of the transmitted signal (e.g., the sequence of pulses in the received signal). Control circuitry 28 may use this comparison to identify a distance between device 10 and the external object (e.g., based on a time delay between the transmitted signal and the received signal and the known propagation speed of the signals over the air and using the range or object detection protocol). If desired, control circuitry 28 may also use transmitted and the received reflected radio-frequency signals to identify an angle of arrival of the reflected signals to help track external objects near to device 10. These distances and angles may sometimes be referred to herein as radio-frequency spatial ranging data. The sequence of pulses may, for example, allow the transceiver circuitry to identify that any given received signal is a reflected version of the transmitted signal instead of some other signal received at device 10 (e.g., because the sequence of pulses will be the same for the reflected version of the transmitted signal as the known sequence of pulses in the transmitted signal). Control circuitry 28 may gather radio-frequency spatial ranging data using one or more antennas 40 and may use the radio-frequency spatial ranging data to help identify the operating environment for device 10. The radio-frequency spatial ranging data may be gathered using signals at any desired frequencies such as ultra-wideband frequencies between about 5 GHz and 8.3 GHz.

If desired, control circuitry 28 may identify a usage scenario for device 10 (e.g., operations that are being performed by device 10) to help determine the operating environment for device 10. For example, control circuitry 28 may identify software or processing tasks that are being performed by device 10, may determine whether device 10 is currently being used to make a telephone call, whether device 10 is sending or receiving a text message or email, being used to browse the internet, etc.

In one suitable arrangement, device 10 may identify the audio state of device 10 (step 94). The audio state may include information indicative of how device 10 is being used to play audio over one or more speakers such as ear speaker 8 of FIG. 1. The audio state may also include information indicative of whether device 10 is being operated in a speaker phone mode. Control circuitry 28 may process the identified audio state to help identify the operating environment of device 10. For example, if control circuitry 28 determines that ear speaker 8 is being used to play audio, control circuitry 28 may determine that device 10 is likely being held to a user's ear. If control circuitry 28 determines that ear speaker 8 is not being used to play audio, control circuitry 28 may determine that device 10 is likely not being held to the user's ear.

As another example, device 10 may identify the wireless communications state of device 10 (step 96). The wireless communications state may include information indicative of the wireless protocols that are currently being used to perform wireless communications and/or information indicative of the type of external equipment being used to wirelessly communicate with device 10. Control circuitry 28 may process the identified wireless communications state to help identify the operating environment of device 10.

For example, if control circuitry 28 determines that device 10 is wirelessly communicating with wireless headphones using a Bluetooth link, control circuitry 28 may determine that device 10 is not being held against the user's ear. As another example, if control circuitry 28 determines that device 10 is not being used to wirelessly convey signals using a cellular telephone protocol, device 10 may determine that device 10 is not being held against the user's ear. As yet another example, if control circuitry 28 determines that device 10 is communicating with a vehicular audio system (e.g., an audio system in a car or other automobile) using a WLAN or Bluetooth link, control circuitry 28 may determine that device 10 is placed on a surface in a vehicle (e.g., a vehicle dashboard).

These examples are merely illustrative. Control circuitry 28 may perform, none, one, more than one, or all of steps 92-112, and/or any other desired operations in monitoring the operating environment of device 10. Steps 92-112 may be performed in any desired order and/or concurrently. Control circuitry 28 may use any desired combination of the information gathered (identified) at steps 92-112 in identifying the operating environment of device 10. Using combinations of sensor data and other information as gathered while processing steps 92-112 may allow control circuitry 28 to more reliably or accurately determine the operating environment for device 10 than in scenarios where only one type of sensor data is used, for example. Control circuitry 28 may use some types of sensor data for monitoring the operating environment at some times and may use other types of sensor data for monitoring the operating environment at other times. This may, for example, allow control circuitry 28 to monitor the operating environment using the least resource-intensive sensors at any given time and/or to divert resources that would be used for some sensors to other device operations, as examples.

At step 114, control circuitry 28 may select antenna settings for wireless communications circuitry 34 based on the monitored operating environment for device 10 (e.g., as identified while processing step 90). For example, control circuitry 28 may select one or more active antennas 40 to use for performing radio-frequency communications (step 116). In scenarios where wireless communications circuitry 34 operates using a MIMO scheme, control circuitry 28 may select a pair of active antennas or more than two active antennas. As one example, control circuitry 28 may disable antennas that are undesirably loaded and detuned by the presence of external objects and may activate antennas that are not excessively loaded by external objects. Control circuitry 28 may activate antennas by switching the antennas into use and/or by activating (enabling) corresponding ports on transceiver circuitry 26 (FIG. 2).

If desired, control circuitry 28 may select active antenna feeds based on the operating environment of device 10 (step 118). For example, control circuitry 28 may selectively activate one of positive antenna feed terminals 46A or 46B of FIG. 7 based on the operating environment. Adjusting the feed location for the antennas in this way may adjust the electric field distribution for the antennas to help to mitigate antenna loading by external objects.

If desired, control circuitry 28 may select desired operating frequencies based on the operating environment of device 10 (step 120). For example, if the antennas are undesirably loaded within a particular frequency band, control circuitry 28 may change the operating frequency of the antennas to frequencies outside of that frequency band to mitigate degradation in antenna efficiency.

If desired, control circuitry 28 may select maximum transmit power levels for antennas 40 based on the operating environment of device 10 (step 122). For example, if control circuitry 28 determines that a particular antenna is being loaded by the user's body or is otherwise in close proximity to the user's body, control circuitry 28 may limit the maximum transmit power level for that antenna to ensure that standards on absorbed radio-frequency energy are met. As another example, if control circuitry 28 determines that no antennas are in proximity to the user's body, control circuitry 28 may operate the antennas with a higher maximum transmit power level than when the user's body is in close proximity to device 10.

If desired, control circuitry 28 may select antenna tuning settings for the antennas based on the operating environment of device 10 (step 124). For example, if control circuitry 28 determines that a particular antenna is being loaded by an external object, control circuitry 28 may adjust antenna tuning circuitry such as tunable components 42 of FIG. 3 (e.g., aperture tuning circuitry and/or matching circuitry) to mitigate any degradation in antenna efficiency on caused by the loading.

These examples are merely illustrative. Control circuitry 28 may perform, none, one, more than one, all of steps 116-124, or other antenna adjustments in selecting the antenna settings for wireless communications circuitry 34. Using different combinations of the operations of steps 116-124 may allow wireless communications circuitry 34 to achieve satisfactory antenna efficiency in desired frequency bands of interest using two or more of antennas 40-1, 40-2, 40-3, and 40-4 (e.g., for performing communications using a MIMO scheme), while also satisfying limits on radio-frequency absorption, regardless of the operating environment for device 10.

At step 126, wireless communications circuitry 34 may be used to transmit and receive radio-frequency signals (e.g., wireless data) using the selected antenna settings (e.g., as selected during step 114). This process may be performed continuously, as indicated by line 128.

Control circuitry 28 may place wireless communications circuitry 34 into a desired operating mode based on the monitored operating environment of device 10. Each operating mode may correspond to a particular monitored (detected) operating environment. Each operating mode may include a corresponding set of antenna settings that are used to control wireless communications circuitry 34 (e.g., control circuitry 28 may place wireless communications circuitry 34 into a particular operating mode while processing step 114 of FIG. 8).

Figure 9:
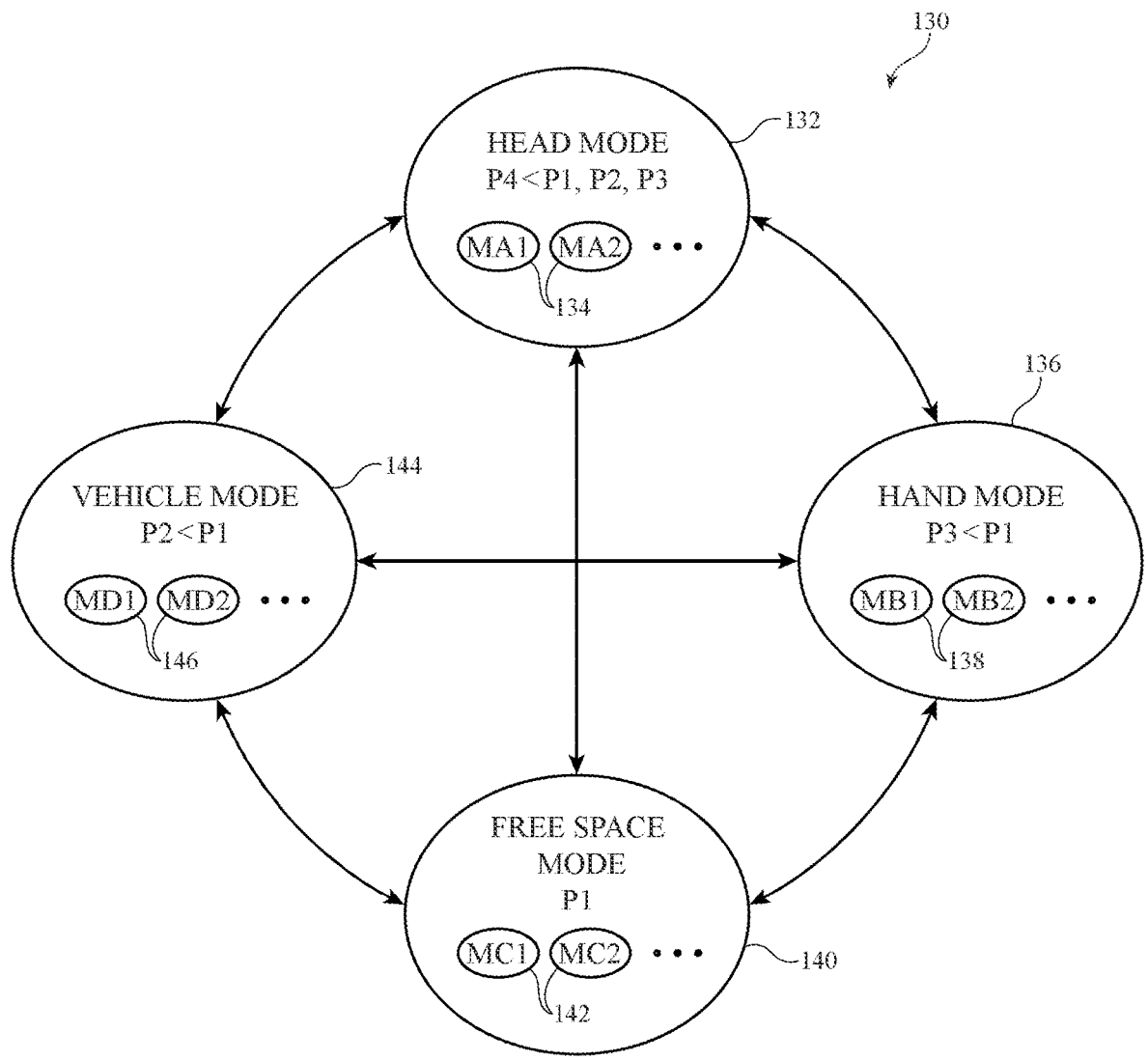
FIG. 9 is a state diagram showing illustrative operating modes for wireless communications circuitry in accordance with an embodiment.

A state diagram 130 of illustrative operating modes (states) for wireless communications circuitry 34 is shown in FIG. 9. As shown in FIG. 9, control circuitry 28 may place wireless communications circuitry 34 into one of four different operating modes such as a first operating mode 132, a second operating mode 136, a third operating mode 140, and a fourth operating mode 144. Control circuitry 28 may determine the operating mode to use based on the information identified while processing step 90 of FIG. 8.

For example, when control circuitry 28 determines that device 10 is being held to the head or ear of a user (e.g., while processing step 90 of FIG. 8), control circuitry 28 may place wireless communications circuitry 34 in first operating mode 132 (sometimes referred to as head mode 132). Head mode 132 may include a first set of antenna settings. Control circuitry 28 may place wireless communications circuitry 34 into head mode 132 by controlling (configuring) wireless communications circuitry 34 using the first set of antenna settings.

The first set of antenna settings may, for example, include a maximum transmit power level P4 that is imposed on antennas 40-1, 40-2, 40-3, and 40-4 (FIG. 7). Maximum transmit power level P4 may be lower than the maximum transmit power level used for the other operating modes. This may help to ensure that device 10 satisfies limits on absorbed radio-frequency energy while device 10 is in very close proximity to the head of a user. The first set of antenna settings may include any other desired antenna settings such as active antenna feed settings, operating frequencies, antenna tuning settings, and active antenna settings if desired.

When control circuitry 28 determines that device 10 is being held in the hand (but not against the head or ear) of a user (e.g., while processing step 90 of FIG. 8), control circuitry 28 may place wireless communications circuitry 34 in second operating mode 136 (sometimes referred to as hand mode 136). Hand mode 136 may include a second set of antenna settings. Control circuitry 28 may place wireless communications circuitry 34 into hand mode 136 by controlling (configuring) wireless communications circuitry 34 using the second set of antenna settings.

The second set of antenna settings may, for example, include a maximum transmit power level P3 that is imposed on antennas 40-1, 40-2, 40-3, and 40-4 (FIG. 7). Maximum transmit power level P3 may be greater than maximum transmit power level P4 (e.g., because there may be less radio-frequency absorption by the user when the user holds device 10 in their hand and away from their head than when the user holds device 10 to their head). Maximum transmit power level P3 may be less than maximum transmit power level P1 associated with a free space operating environment (e.g., to help ensure that device 10 satisfies limits on absorbed radio-frequency energy while device 10 is being held by the user). The second set of antenna settings may include any other desired antenna settings such as active antenna feed settings, operating frequencies, antenna tuning settings, and active antenna settings if desired.

When control circuitry 28 determines that device 10 is not being held by a user and that device 10 is not being operated on a vehicle surface (e.g., while processing step 90 of FIG. 8), control circuitry 28 may place wireless communications circuitry 34 in third operating mode 140 (sometimes referred to as free space mode 140). Free space mode 140 may include a third set of antenna settings. Control circuitry 28 may place wireless communications circuitry 34 into free space mode 140 by controlling (configuring) wireless communications circuitry 34 using the third set of antenna settings.

The third set of antenna settings may, for example, include a maximum transmit power level P1 that is imposed on antennas 40-1, 40-2, 40-3, and 40-4 (FIG. 7). Maximum transmit power level P1 may be greater than maximum transmit power levels for the other operating modes of wireless communications circuitry 34 (e.g., because the radio-frequency signals will not be substantially absorbed by a user in a free space environment). The third set of antenna settings may include any other desired antenna settings such as active antenna feed settings, operating frequencies, antenna tuning settings, and active antenna settings if desired.

When control circuitry 28 determines that device 10 is placed on a vehicle surface (e.g., while processing step 90 of FIG. 8), control circuitry 28 may place wireless communications circuitry 34 in fourth operating mode 144 (sometimes referred to as vehicle mode 144). The vehicle surface may include a dashboard of a vehicle such as a car or other automobile, an electronic device mount affixed to the dashboard, a cup-holder, a wireless-charging surface (pad) within the vehicle, or other surfaces within the vehicle.

Vehicle mode 144 may include a fourth set of antenna settings. Control circuitry 28 may place wireless communications circuitry 34 into vehicle mode 144 by controlling (configuring) wireless communications circuitry 34 using the fourth set of antenna settings. The fourth set of antenna settings may, for example, include a maximum transmit power level P2 that is imposed on antennas 40-1, 40-2, 40-3, and 40-4 (FIG. 7). Maximum transmit power level P2 may be less than maximum transmit power level P1 of free space mode 140 (e.g., due to the likely presence of people within the vehicle and/or electronic equipment in the vehicle that may be sensitive to radio-frequency signals transmitted by device 10). Maximum transmit power level P2 may be equal to, less than, or greater than maximum transmit power level P3 of hand mode 136. The fourth set of antenna settings may include any other desired antenna settings such as active antenna feed settings, operating frequencies, antenna tuning settings, and active antenna settings if desired.

Each operating mode may include corresponding operating sub-modes. Once control circuitry 28 places wireless communications circuitry 34 into one of operating modes 132, 136, 140, or 144, control circuitry 28 may further adjust the antenna settings based on the monitored operating environment by placing wireless communications circuitry 34 into a selected operating sub-mode corresponding to the selected operating mode. Each operating sub-mode may correspond to a particular monitored (detected) operating environment. Each operating sub-mode may include a corresponding set of antenna settings that are used to control wireless communications circuitry 34 (e.g., control circuitry 28 may place wireless communications circuitry 34 into a particular operating sub-mode while processing step 114 of FIG. 8).

As shown in FIG. 9, control circuitry 28 may place device 10 into a selected operating sub-mode 134 (e.g., a first sub-mode MA1, a second sub-mode MA2, etc.) while wireless communications circuitry 34 is in head mode 132. As an example, control circuitry 28 may place wireless communications circuitry 34 into operating sub-mode MA1 when device 10 is being held to the left ear of a user and may place wireless communications circuitry 34 into operating sub-mode MA2 when device 10 is being held to the right ear of a user.

Control circuitry 28 may place device 10 into a selected operating sub-mode 138 (e.g., a first sub-mode MB1, a second sub-mode MB2, etc.) while wireless communications circuitry 34 is in hand mode 136. As an example, control circuitry 28 may place wireless communications circuitry 34 into operating sub-mode MB1 when device 10 is being held in a portrait orientation with the user's left hand and may place wireless communications circuitry 34 into operating sub-mode MB2 when device 10 is being held in a landscape orientation with both of the user's hands.

Control circuitry 28 may place device 10 into a selected operating sub-mode 142 (e.g., a first sub-mode MC1, a second sub-mode MC2, etc.) while wireless communications circuitry 34 is in free space mode 140. As an example, control circuitry 28 may place wireless communications circuitry 34 into operating sub-mode MC1 when device 10 is resting face up on a non-vehicle surface and may place wireless communications circuitry 34 into operating sub-mode MC2 when device 10 is resting face down on a non-vehicle surface.

Control circuitry 28 may place device 10 into a selected operating sub-mode 146 (e.g., a first sub-mode MD1, a second sub-mode MD2, etc.) while wireless communications circuitry 34 is in vehicle mode 144. As an example, control circuitry 28 may place wireless communications circuitry 34 into operating sub-mode MD1 when device 10 is resting on a wireless charging pad in a vehicle and may place wireless communications circuitry 34 into operating sub-mode MD2 when device 10 is affixed to a vehicle dashboard using an electronic device mount.

The example of FIG. 9 is merely illustrative. In general, wireless communications circuitry 34 may have any desired number of operating modes corresponding to any desired operating environment and each operating mode may include zero, one, two, more than two, or any desired number of operating sub-modes. Control circuitry 28 may dynamically adjust the antenna settings for wireless communications circuitry 34 (e.g., control circuitry 28 may dynamically adjust the operating modes and operating sub-modes for wireless communications circuitry 34) as the operating environment for device 10 changes over time.

Figure 10:
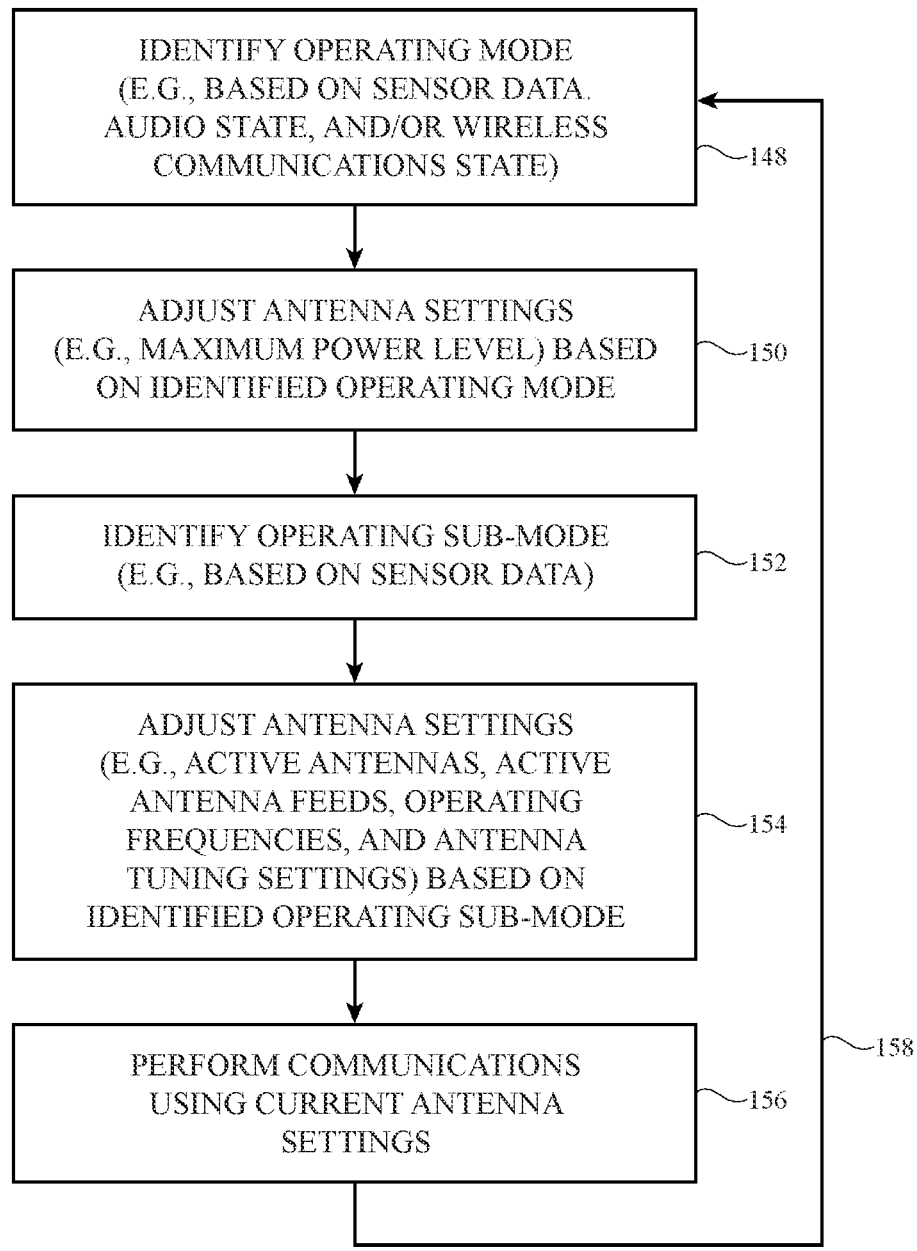
FIG. 10 is a flow chart of illustrative steps that may be involved in adjusting wireless communications circuitry based on identified operating modes of the wireless communications circuitry in accordance with an embodiment.

FIG. 10 is a flow chart of illustrative steps involved in operating control circuitry 28 to adjust wireless communications circuitry 34 between different operating modes and operating sub-modes. At step 148, control circuitry 28 may identify an operating mode to use for wireless communications circuitry 34 (e.g., while processing step 114 of FIG. 8) based on the monitored operating environment for device 10 (e.g., as monitored while processing step 90 of FIG. 8).

As an example, control circuitry 28 may identify that head mode 132 is to be used when control circuitry 28 determines that audio data is being played through ear speaker 8 (FIG. 1), when position and orientation sensor data indicates that device 10 is being held in an upright position, when position and orientation sensor data indicates that device 10 exhibits periodic motion patterns associated with being held by a user, when proximity sensor data indicates that an external object is in close proximity to device 10, when impedance sensor data indicates that antenna 40-1 and/or 40-2 are being loaded by an external object, when a grip map for display 14 indicates that a user is holding device 10 with a single hand in a portrait orientation, when image data gathered by a front-facing image sensor on device 10 indicates that a user's face or ear is facing display 14, when ambient light sensor data indicates relatively dark ambient conditions at the front face of device 10 and relatively bright ambient conditions at the rear face of device 10, when radio-frequency spatial ranging operations indicate that an external object is in relatively close proximity to device 10, when microphone data indicates that the user's mouth is located at an angle with respect to device 10 that is associated with the user holding device 10 to their head, when control circuitry 28 determines that device 10 is being used to place a cellular telephone call, and/or any desired combination of these factors and/or other factors.

Control circuitry 28 may identify that hand mode 136 of FIG. 9 is to be used when, for example, control circuitry 28 determines that audio data is not being played through ear speaker 8 (FIG. 1), when position and orientation sensor data indicates that device 10 is being held in a position consistent with handheld use away from the user's head, when position and orientation sensor data indicates that device 10 exhibits periodic motion patterns associated with being held by a user, when proximity sensor data indicates that an external object is in close proximity to device 10, when impedance sensor data indicates that one or more antennas 40 are being loaded by an external object, when a grip map for display 14 indicates that a user is holding device 10 with a single hand or both hands in a portrait or landscape orientation, when image data gathered by a front-facing image sensor on device 10 indicates that a user's face or ear is not near to or facing display 14, when radio-frequency spatial ranging operations indicate that an external object is in relatively close proximity to device 10, when microphone data indicates that the user's mouth is located at an angle with respect to device 10 that is associated with the user holding device 10 away from their head, when control circuitry 28 determines that device 10 is being not being used to place a cellular telephone call, and/or any desired combination of these factors and/or other factors.

Control circuitry 28 may identify that free space mode 140 of FIG. 9 is to be used when control circuitry 28 determines that audio data is not being played through ear speaker 8 (FIG. 1), when position and orientation sensor data indicates that device 10 is in a stationary position (e.g., a stationary face-up or face-down position), when impedance sensor data indicates that antennas 40 are not being significantly loaded by an external object, when a grip map for display 14 indicates that a user is not holding device 10, when image data gathered image sensors on device 10 indicate that a user's body is not near to device 10, when ambient light sensor data indicates relatively dark ambient conditions at one side of device 10 and relatively bright ambient conditions at another side of device 10, when microphone data indicates that the user's mouth is located relatively far away from device 10, and/or any desired combination of these factors and/or other factors.

Control circuitry 28 may identify that vehicle mode 144 of FIG. 9 should be used when control circuitry 28 determines that audio data is not being played through ear speaker 8 (FIG. 1), when control circuitry 28 determines that device 10 is operating in a speaker phone mode, when position and orientation sensor data indicates that device 10 is undergoing periodic or predetermined motion (vibration) patterns associated with travel in a vehicle, when impedance sensor data indicates that antennas 40 are not being significantly loaded by an external object, when microphone data indicates that the user's mouth is located relatively far away from device 10, when control circuitry 28 determines that wireless communications circuitry 34 is wirelessly communicating with a vehicular audio system using a Bluetooth or WLAN link, and/or any desired combination of these factors and/or other factors.

At step 150, control circuitry 28 may place wireless communications circuitry 34 into the identified operating mode by configuring wireless communications circuitry 34 with the antenna settings associated with the identified operating mode. For example, control circuitry 28 may place wireless communications circuitry 34 in head mode 132 by imposing maximum transmit power level P4 on antennas 40-1, 40-2, 40-3, and/or 40-4, may place wireless communications circuitry 34 in hand mode 136 using maximum transmit power level P3, may place wireless communications circuitry 34 in free space mode 140 using maximum transmit power level P1, and may place wireless communications circuitry 34 in vehicle mode 144 using maximum transmit power level P2 (FIG. 9).

At step 152, control circuitry 28 may identify an operating sub-mode to use for wireless communications circuitry 34 (e.g., while processing step 114 of FIG. 8) based on the monitored operating environment for device 10 (e.g., as monitored while processing step 90 of FIG. 8).

For example, when wireless communications circuitry 34 is in head mode 132, control circuitry 28 may identify that a first operating sub-mode should be used (e.g., one of operating sub-modes 134 of FIG. 9) when device 10 is being held to the user's left ear, may identify that a second operating sub-mode should be used when device 10 is being held to the user's right ear, may identify that a third operating sub-mode should be used when device 10 is separated from the user's left ear by a predetermined distance, may identify that a fourth operating sub-mode should be used when device 10 is separated from the user's right ear by a predetermined distance, may identify that a fifth operating sub-mode should be used when a user is holding device 10 to their chin, etc.

Control circuitry 28 may identify the sub-mode of head mode 132 to use based on any desired combination of the information gathered while processing step 90 of FIG. 8. In one suitable arrangement, control circuitry 28 may identify the operating sub-mode to use based on image data, proximity sensor data, spatial ranging data, grip map data, and/or impedance data. For example, control circuitry 28 may identify that the first operating sub-mode should be used when image data captured by a front-facing image sensor includes an image of the user's left ear, when the proximity sensor data indicates that an external object is in close proximity to device 10, and/or when the impedance data and/or grip map data indicates that the user is holding device 10. As another example, control circuitry 28 may identify that the third operating sub-mode should be used when the proximity sensor data and/or the image data indicates that the user's left ear is located relatively far from device 10. These examples are merely illustrative and any desired sensor data may be used in any desired manner.

When wireless communications circuitry 34 is in hand mode 136, control circuitry 28 may, for example, identify that a first operating sub-mode (e.g., one of operating sub-modes 138 of FIG. 9) should be used when device 10 is being held in a portrait orientation by the user's left hand, that a second operating sub-mode should be used when device 10 is being held in a portrait orientation by the user's right hand, that a third operating sub-mode should be used when device 10 is being held in a landscape orientation by the user's left hand, that a fourth operating sub-mode should be used when device 10 is being held in a landscape orientation by both of the user's hands, etc. Control circuitry 28 may identify the sub-modes of hand mode 136 to sue based on any desired combination of the information gathered while processing step 90 of FIG. 8. For example, control circuitry 28 may identify the operating sub-mode to use based on grip map data, position and orientation sensor data, and/or impedance data.

When wireless communications circuitry 34 is in free space mode 140, control circuitry 28 may, for example, identify that a first operating sub-mode (e.g., one of operating sub-modes 142 of FIG. 9) should be used when device 10 is placed in a face-up orientation, that a second operating sub-mode should be used when device 10 is placed in a face-down orientation, etc. Control circuitry 28 may identify the sub-modes of hand mode 136 to use based on any desired combination of the information gathered while processing step 90 of FIG. 8 (e.g., orientation sensor data, ambient light sensor data, impedance sensor data, etc.).

When wireless communications circuitry 34 is in vehicle mode 144, control circuitry 28 may, for example, identify that a first operating sub-mode (e.g., one of operating sub-modes 146 of FIG. 9) should be used when device 10 is placed in a face-up orientation on a vehicle surface, that a second operating sub-mode should be used when device 10 is affixed to a vehicle dashboard using an electronic device mount, etc. Control circuitry 28 may identify the sub-modes of hand mode 136 to use based on any desired combination of the information gathered while processing step 90 of FIG. 8 (e.g., orientation sensor data, ambient light sensor data, etc.).

At step 154, control circuitry 28 may place wireless communications circuitry 34 into the identified operating sub-mode by configuring wireless communications circuitry 34 with the antenna settings associated with the identified operating sub-mode. For example, control circuitry 28 may place wireless communications circuitry 34 into the identified operating sub-mode by activating selected antenna feeds, activating selected antennas, selecting desired frequencies, and/or by selecting tuning settings for the antennas. If desired, control circuitry 28 may further adjust the transmit power level and/or maximum transmit power level when placing wireless communications circuitry 34 in the identified operating sub-mode.

At step 156, wireless communications circuitry 34 may be used to transmit and receive radio-frequency signals (e.g., wireless data) using the identified operating mode and operating sub-mode. This process may be performed continuously, as indicated by line 158. By placing wireless communications circuitry 34 into a desired operating mode before further placing the circuitry into a desired operating sub-mode, wireless communications circuitry 34 may ensure that a desired maximum transmit power level is established before further antenna refinements are performed (e.g., to ensure that device 10 satisfies limits on radio-frequency absorption even while steps 152-154 are performed).

If desired, control circuitry 28 may verify the radio-frequency performance of wireless communications circuitry 34 after each antenna setting adjustment. For example, control circuitry 28 may gather impedance data or other data indicative of antenna performance after performing step 150 and, if the wireless communications circuitry exhibits insufficient performance, may select a different operating mode to use and/or may sweep through antenna settings until a satisfactory antenna setting is found. Similarly, control circuitry 28 may gather impedance data or other data indicative of antenna performance after performing step 154 and, if the wireless communications circuitry exhibits insufficient performance, may select a different operating sub-mode to use and/or may sweep through antenna settings until a satisfactory antenna setting is found.

In one suitable arrangement, control circuitry 28 may identify the operating mode and operating sub-mode based on predetermined (e.g., stored) antenna settings that are known to be associated with the corresponding operating environment. In another suitable arrangement, control circuitry 28 may sweep through different operating modes and operating sub-modes (e.g., while processing steps 148 and 154), may gather radio-frequency performance metric data at each step in the sweep, and may process the gathered radio-frequency performance metric data until an optimal operating mode or operating sub-mode is found (e.g., antenna settings that maximize antenna efficiency while satisfying limits on absorbed radio-frequency energy).

Figure 11:
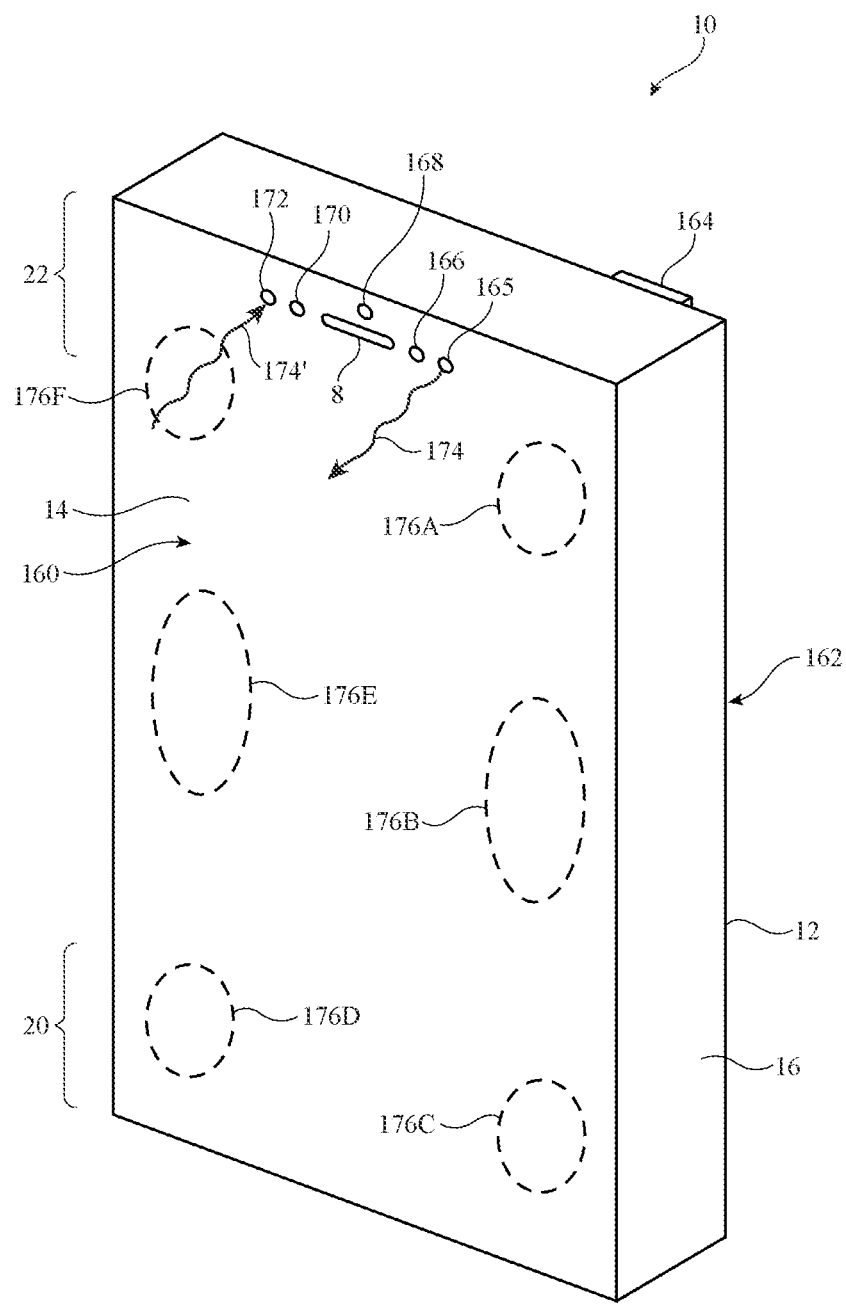
FIG. 11 is a perspective view of an illustrative electronic device having sensors for gathering sensor data that is used to adjust wireless communications circuitry in accordance with an embodiment.

FIG. 11 is a perspective view of device 10 showing how different sensors may be used for gathering sensor data that is used to identify the operating environment of device 10 (e.g., while processing step 90 of FIG. 8).

As shown in FIG. 11, display 14 may be located at front face 160 of device 10. One or more rear-facing image sensors 164 may be located at the opposing rear face 162 of device 10. Rear-facing image sensors 164 may generate image data in response to visible and/or infrared light. Sensors and other components such as ear speaker 8 may be located at front face 160 within upper region 22 of device 10.

In the example of FIG. 11, a first front-facing image sensor 166, a second front-facing image sensor 172, and ambient light sensor 168 are located at front face 160. A capacitive proximity sensor may also be located at front face 160 within upper region 22 if desired. Image sensor 166 may generate image data in response to visible light. If desired, image sensor 166 may also capture light at some infrared wavelengths. Image sensor 172 may generate image data in response to infrared light. If desired, image sensor 172 may also capture light at some visible wavelengths. Light emitting components such as light sources 170 and 165 may be located at front face 160. Light sources 170 and/or 165 may emit infrared light 174. Infrared light 174 may be reflected off of objects in front of display 14 such as the user's face or ears. This reflected infrared light 174' may be captured by image sensor 172 as facial recognition image sensor data, if desired. Light source 165 may be a dot projector and light source 170 may be a flood illuminator, as examples. This example is merely illustrative and, in general, any desired light sources and/or sensors may be formed at front face 160 of device 10.

As shown in FIG. 11, display 14 may gather touch and/or force sensor data indicative of how a user is gripping device 10. This data may include a grip map that maps the locations and/or force of contact between the user's hand and display 14. The grip map may identify regions (locations) 176 such as regions 176A, 176B, 176C, 176D, 176E, 176F, and/or other locations across display 14 that are being touched by the user's hand. This data may be used to determine the operating mode and/or operating sub-mode for wireless communications circuitry 34.

As an example, when a user is holding device 10 in a landscape orientation with both hands, the grip map may include data for locations 176C and 176A indicative of the user's hand contacting display 14 at locations 176C and 176A. As another example, when a user is holding device 10 in a portrait orientation with their left hand, the grip map may include data for location 176D associated with the user's thumb or palm contacting display 14 and/or data for location 176B associated with the user's fingertips contacting display 14. These examples are merely illustrative and, in general, the grip map may be used to characterize any manner with which the user holds device 10. This display sensor data as well as sensor data gathered by sensors 172, 166, 168, 164, and/or other sensors may be used to identify the operating environment of device 10 and thus the operating mode and/or operating sub-mode for wireless communications circuitry 34.

Figure 12:
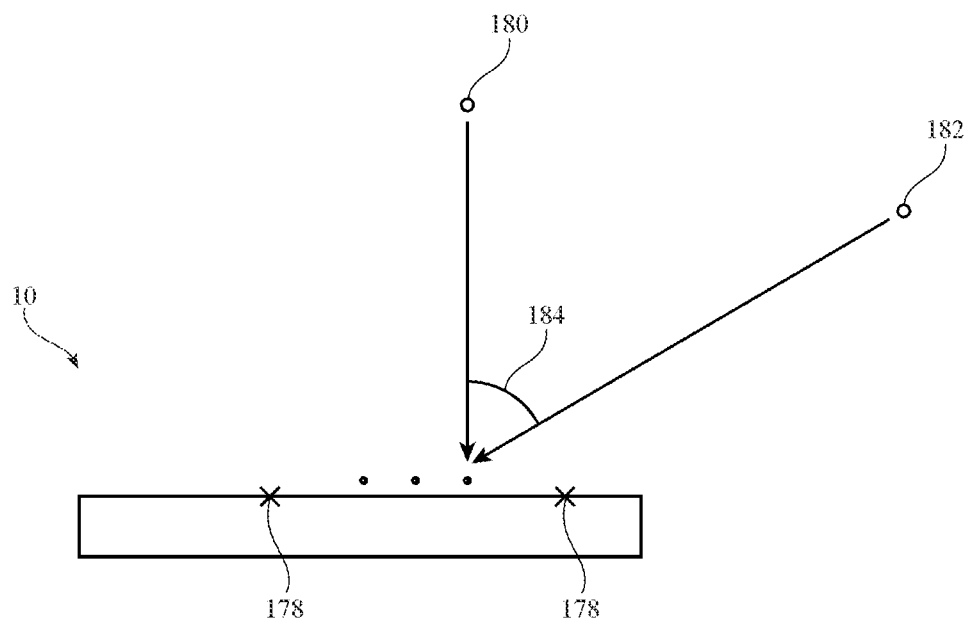
FIG. 12 is a side view of an illustrative electronic device having multiple microphones for gathering microphone data that is used to adjust wireless communications circuitry in accordance with an embodiment.

FIG. 12 is a side-view showing how control circuitry 28 may use multiple microphones for identifying the orientation of device 10 relative to the user (e.g., while processing step 102 of FIG. 8). As shown in FIG. 12, device 10 may include multiple microphones 178 at different locations across the device. Each microphone may gather audio data from the user's voice. Control circuitry 28 may process the audio data from each microphone to determine relative volumes (magnitudes) of the user's voice from each microphone and/or time delays between the microphones. Control circuitry 28 may use this data (and known distances between each of the microphones) to determine the angle of arrival 184 of the user's voice. When control circuitry 28 determines that angle of arrival 184 is approximately zero (e.g., normal to a face of device 10), control circuitry 28 may determine that the user's voice is located at location 180. When control circuitry 28 determines that angle of arrival 184 is larger, control circuitry 28 may determine that the user's voice is located at another location such as location 182. In this way, microphones 178 may help to track the location of the user's voice (and thus the location of the user's mouth and head) relative to device 10. This process may be used to determine angle of arrival of the audio captured by microphones 178 and may sometimes be referred to herein as microphone beam forming.

Control circuitry 28 may use this information to help determine the operating environment and thus the operating mode and sub-mode to use for wireless communications circuitry 34. For example, when the microphone data indicates that the user's mouth is located at location 182, control circuitry 28 may determine that device 10 is not being held against the user's head. Control circuitry 28 may determine that device 10 is being held against the user's head when the microphone data indicates that the user's head is located at location 180, for example.

Figure 13:
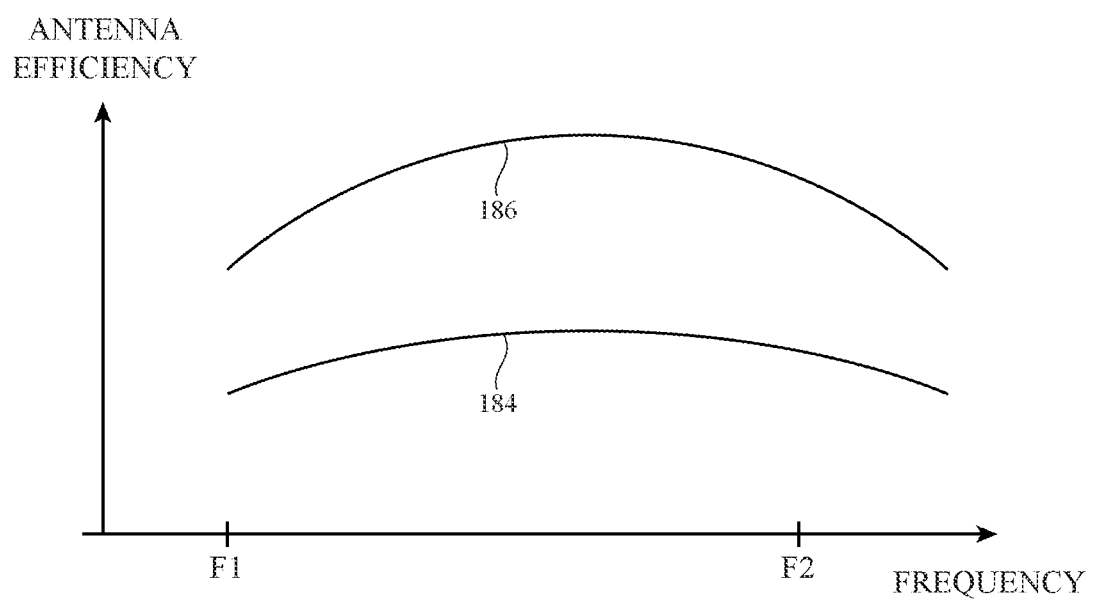
FIG. 13 is a plot of antenna performance (antenna efficiency) of an illustrative antenna when operated using different antenna settings in accordance with an embodiment.

FIG. 13 is a graph in which antenna performance (antenna efficiency) has been plotted as a function of operating frequency for antennas 40-1, 40-2, 40-3, and/or 40-4. As shown in FIG. 13, curve 184 plots an exemplary antenna efficiency of antennas 40-1, 40-2, 40-3, and/or 40-4 while wireless communications circuitry 34 is operating in an unsuitable operating mode or operating sub-mode for the given operating environment. For example, curve 184 may be associated with operation of wireless communications circuitry 34 in free space mode 140 (FIG. 9) while device 10 is being held by a user, operation in hand mode 136 while device 10 is being held to a user's head, etc.

The antenna efficiency associated with curve 184 may be unsatisfactory (e.g., below a threshold efficiency) across a frequency band of interest (e.g., between frequencies F1 and F2). By placing wireless communications circuitry 34 in the operating mode and operating sub-mode corresponding to the current operating environment (e.g., while processing the steps of FIGS. 8 and 10), antennas 40-1, 40-2, 40-3, and/or 40-4 may exhibit satisfactory antenna efficiency across the frequency band of interest, as shown by curve 186.

The example of FIG. 13 is merely illustrative. In general, antenna 40-4 may cover any desired bands at any desired frequencies (e.g., antenna 40-4 may exhibit any desired number of efficiency peaks extending over any desired frequency bands). Curves 184 and 188 may have other shapes if desired.

In this way, control circuitry 28 may ensure that each of antennas 40-1, 40-2, 40-3, and 40-4 have been adjusted to mitigate loading by different external objects at different locations with respect to device 10. This may allow the antennas to operate with satisfactory antenna efficiency regardless of the operating environment of the device even if the operating environment changes over time. At the same time, wireless communications circuitry 34 may comply with regulatory or industry limits on absorbed radio-frequency energy and may communicate with a satisfactory data rate (e.g., using a MIMO scheme and two or more of antennas 40-1, 40-2, 40-3, and 40-4 at a given time).

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a housing;
a display mounted to the housing;
wireless communications circuitry including transceiver circuitry and configured to convey radio-frequency signals over a plurality of antennas using antenna settings, the transceiver circuitry configured to transmit a radio-frequency signal using a given antenna in the plurality of antennas and configured to receive a reflected version of the transmitted radio-frequency signal using the given antenna;
an impedance sensor coupled to the plurality of antennas and configured to generate radio-frequency phase and magnitude information associated with the plurality of antennas; and
control circuitry configured to generate radio- frequency spatial ranging data indicative of a distance between the electronic device and an object external to the electronic device based on the transmitted radio-frequency signal and the reflected version of the transmitted radio-frequency signal, wherein the control circuitry is configured to adjust the antenna settings based on the radio-frequency spatial ranging data and the radio-frequency phase and magnitude information.

2. The electronic device defined in claim 1, wherein the control circuitry is configured to generate the radio-frequency spatial ranging data based on angle of arrival data for the reflected version of the transmitted radio- frequency signal.

3. The electronic device defined in claim 1, wherein the control circuitry is configured to generate the radio-frequency spatial ranging data based on a comparison between a portion of the transmitted radio-frequency signal and a portion of the reflected version of the transmitted radio-frequency signal.

4. The electronic device defined in claim 3, wherein the transmitted radio-frequency signal comprises a first set of pulses, and the reflected version of the transmitted radio-frequency signal comprises a second set of pulses corresponding to the first set of pulses.

5. The electronic device defined in claim 4, wherein the comparison between the portion of the transmitted radio-frequency signal and the portion of the reflected version of the transmitted radio-frequency signal comprises a comparison between the first set of pulses and the second set of pulses.

6. The electronic device defined in claim 1 further comprising an accelerometer, wherein the control circuitry is configured to adjust the antenna settings based on accelerometer data generated by the accelerometer.

7. The electronic device defined in claim 1, wherein the control circuitry is configured to adjust the antenna settings based on touch sensor data generated by the display.

8. The electronic device defined in claim 1 further comprising:
additional sensor circuitry configured to generate additional sensor data; and
an additional antenna in the plurality of antennas configured to transmit radio-frequency signals, wherein the control circuitry is configured to identify whether the electronic device is being operated in a given one of first, second, third, and fourth environments based on the additional sensor data, wherein the control circuitry is further configured to place the additional antenna in:
- a free space operating mode in response to determining that the electronic device is being operated in the first environment,
- a first non-free space operating mode in response to determining that the electronic device is being operated in the second environment,
- a second non-free space operating mode in response to determining that the electronic device is being operated in the third environment, and
- a third non-free space operating mode in response to determining that the electronic device is being operated in the fourth environment, wherein the additional antenna is configured to transmit the radio-frequency signals using a first maximum transmit power level in the free space operating mode and using respective second, third, and fourth maximum transmit power levels in the first, second, and third non-free space operating modes, the first maximum transmit power level being greater than each of the second, third, and fourth maximum transmit power levels.

9. The electronic device defined in claim 1 further comprising:
additional sensor circuitry configured to generate additional sensor data; and
an additional antenna in the plurality of antennas configured to transmit radio-frequency signals, wherein the control circuitry is configured to identify whether the electronic device is being operated in a given one of first, second, and third environments based on the additional sensor data, wherein the control circuitry is configured to place the additional antenna in:
- a free space operating mode in response to determining that the electronic device is being operated in the first environment, the free space operating mode comprising a first antenna setting for the additional antenna when operating in the first environment,
- a hand mode in response to determining that the electronic device is being operated in the second environment, the hand mode comprising a second antenna setting for the additional antenna when operating in the second environment, and
- a vehicle mode in response to determining that the electronic device is being operated in the third environment, the vehicle mode comprising a third antenna setting for the additional antenna when operating in the third environment.

10. The electronic device defined in claim 1, wherein the impedance sensor comprises radio-frequency coupler circuitry coupled to the given antenna and to a radio-frequency transmission line for the given antenna.

11. The electronic device defined in claim 1, wherein the radio-frequency phase and magnitude data is indicative of an impedance of the given antenna.

12. An electronic device comprising:
sensor circuitry configured to generate sensor data;
an antenna configured to convey radio-frequency signals; and
control circuitry configured to identify information indicative of different operating environments of the electronic device at least partly based on the sensor data and configured to place the antenna in:
- a free space operating mode in response to information indicative of the electronic device operating in a free space environment, the free space operating mode comprising a first antenna setting for operating the antenna based on a first maximum antenna transmit power level,
- a hand mode, the hand mode comprising a second antenna setting for operating the antenna, and
- a vehicle mode in response to information indicative of the electronic device operating in an additional environment in which the electronic device is within a vehicle, the vehicle mode comprising a third antenna setting for operating the antenna based on a second maximum antenna transmit power level different than the first maximum antenna transmit power level.

13. The electronic device defined in claim 12, wherein the control circuitry is configured to place the antenna in:
- a first sub-mode in the vehicle mode in response to the electronic device being on a first surface within the vehicle, and
- a second sub-mode in the vehicle mode in response to the electronic device being on a second surface within the vehicle.

14. The electronic device defined in claim 12, wherein the second maximum antenna transmit power level is less than the first maximum antenna transmit power level.

15. The electronic device defined in claim 12, wherein the control circuitry is configured to place the antenna in the hand mode in response to information indicative of the electronic device operating in a third environment in which the electronic device is being held by a user.

16. The electronic device defined in claim 12, wherein the control circuitry is configured to place the antenna in:
a head mode, the head mode comprising a fourth antenna setting for operating the antenna.

17. The electronic device defined in claim 16, wherein the control circuitry is configured to place the antenna in the head mode in response to information indicative of the electronic device operating in a fourth environment in which the electronic device is being held a head of a user.

* * * * *